(12) United States Patent
Murata

(10) Patent No.: US 12,019,037 B2
(45) Date of Patent: Jun. 25, 2024

(54) SIGNAL PROCESSING METHOD, LEARNING MODEL GENERATION METHOD, SIGNAL PROCESSING DEVICE, RADIATION DETECTING DEVICE, AND RECORDING MEDIUM

(71) Applicant: HORIBA, LTD., Kyoto (JP)

(72) Inventor: Shunsuke Murata, Kyoto (JP)

(73) Assignee: HORIBA, LTD., Kyoto (JP)

( * ) Notice: Subject to any disclaimer, the term of this patent is extended or adjusted under 35 U.S.C. 154(b) by 102 days.

(21) Appl. No.: 17/996,889

(22) PCT Filed: Mar. 18, 2021

(86) PCT No.: PCT/JP2021/011045
§ 371 (c)(1),
(2) Date: Oct. 21, 2022

(87) PCT Pub. No.: WO2021/220657
PCT Pub. Date: Nov. 4, 2021

(65) Prior Publication Data
US 2023/0152251 A1 May 18, 2023

(30) Foreign Application Priority Data

Apr. 27, 2020 (JP) ................. 2020-078471

(51) Int. Cl.
*G01N 23/223* (2006.01)
*G01T 1/17* (2006.01)
*G01T 1/36* (2006.01)

(52) U.S. Cl.
CPC ............ *G01N 23/223* (2013.01); *G01T 1/17* (2013.01); *G01T 1/36* (2013.01)

(58) Field of Classification Search
CPC ............ G01N 23/223; G01T 1/17; G01T 1/36
See application file for complete search history.

(56) References Cited

U.S. PATENT DOCUMENTS

2016/0313459 A1* 10/2016 Scoullar ................ G06F 30/20
2019/0244056 A1*  8/2019 Roy ........................ G06N 7/01

FOREIGN PATENT DOCUMENTS

| JP | H08-029538 A | 2/1996 |
| JP | 2007-057356 A | 3/2007 |
| JP | 2014-516411 A | 7/2014 |
| WO | 2017187972 A1 | 11/2017 |

OTHER PUBLICATIONS

International Search Report for the corresponding Patent Application No. PCT/JP2021/011045 dated Jun. 8, 2021, with English translation.

* cited by examiner

*Primary Examiner* — Hugh Maupin
(74) *Attorney, Agent, or Firm* — LUCAS & MERCANTI, LLP

(57) ABSTRACT

A signal processing method counting step waves in response to detection of radiation or pulse waves obtained by converting the step waves by wave height, comprising: inputting signal value sequence in response to the detection of the radiation to a learning model outputting, when time-series signal value sequence is input, information related to presence or absence of the step wave or the pulse wave in a signal configured with the signal value sequence or information related to a wave height of the step wave or the pulse wave in the signal; and counting the step wave or the pulse wave by wave height according to the information output by the learning model.

11 Claims, 23 Drawing Sheets

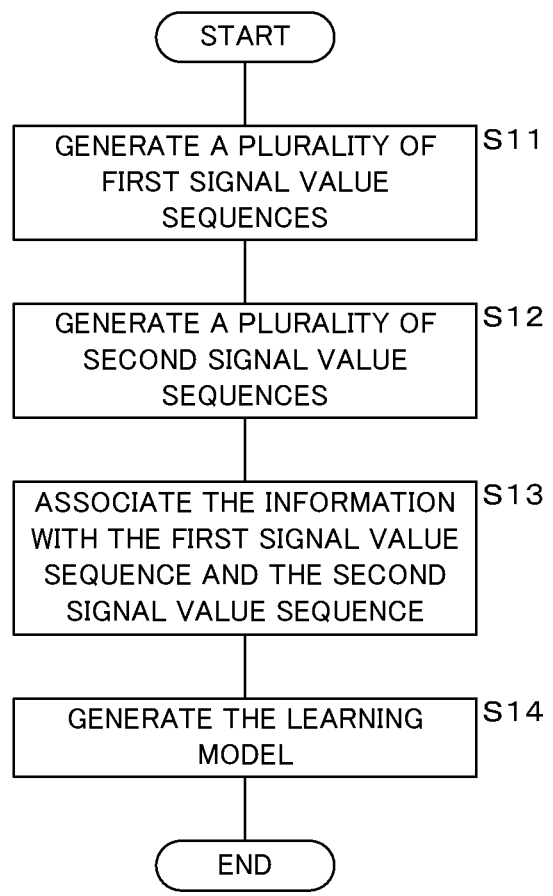
F I G. 7

F I G. 1 7
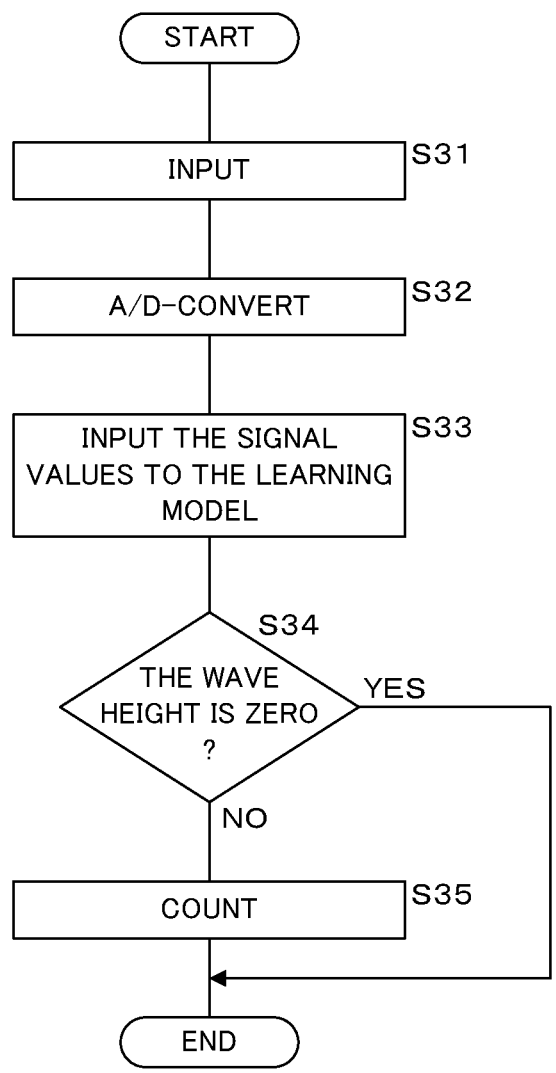

SIGNAL PROCESSING METHOD, LEARNING MODEL GENERATION METHOD, SIGNAL PROCESSING DEVICE, RADIATION DETECTING DEVICE, AND RECORDING MEDIUM

CROSS REFERENCE TO RELATED APPLICATION

This Application is a 371 of PCT/JP2021/011045 filed on Mar. 18, 2021 which, in turn, claimed the priority of Japanese Patent Application No. 2020-078471 filed on Apr. 27, 2020, both applications are incorporated herein by reference.

TECHNICAL FIELD

The present invention relates to a signal processing method, a learning model generating method, a signal processing device, a radiation detecting device, and a recording medium for processing a signal generated by detection of radiation.

BACKGROUND ART

A radiation detecting device that detects radiation such as X-rays includes a radiation detector and a signal processing device that processes a signal output by the radiation detector. The radiation detector is configured by using a semiconductor radiation detection element or the like and outputs a step wave each time when the radiation is detected. The signal processing device converts the step wave into a pulse wave and measures a wave height of the pulse wave. The wave height of the pulse wave corresponds to energy of the radiation. In a radiation detecting device of the related art, a threshold value is set, and when a signal value exceeds the threshold value, it is determined that the pulse wave is detected, and the wave height of the detected pulse wave is measured. Patent Document 1 discloses an example of the radiation detecting device of the related art.

PRIOR ART DOCUMENT

Patent Document

[Patent Document 1] International Publication No. 2017/187972

SUMMARY OF INVENTION

Problems to be Solved by Invention

When noise included in a signal exceeds a threshold value, a radiation detecting device will erroneously detect a pulse wave. In order to prevent erroneous detection, the threshold value needs to have a sufficiently large value. When elements included in a sample are detected by detecting fluorescent X-rays with the radiation detecting device, energy of the detected fluorescent X-rays becomes a value depending on a type of the element. Generally, the higher an atomic number of the element, the higher the energy of fluorescent X-rays. Since the radiation detecting device cannot detect fluorescent X-rays having low energy and a wave height of the pulse wave not reaching the threshold value, it is difficult to detect light elements having low energy of fluorescent X-rays. For example, when the radiation detecting device having a threshold value of 0.4 keV is used, an element having an atomic number smaller than that of oxygen cannot be detected.

The present disclosure has been made in view of such circumstances, and an object of the present disclosure is to provide a signal processing method, a learning model generating method, a signal processing device, a radiation detecting device, and a recording medium enabling detection of low-energy radiation.

A signal processing method according to the an aspect of the present disclosure, counting step waves in response to detection of radiation or pulse waves converted from the step waves by wave height, is characterized by comprising: inputting signal value sequence in response to the detection of the radiation to a learning model outputting, when time-series signal value sequence is input, information related to presence or absence of the step wave or the pulse wave in a signal configured with the signal value sequence or information related to a wave height of the step wave or the pulse wave in the signal; and counting the step wave or the pulse wave by wave height according to the information output by the learning model.

In an aspect of the present disclosure, the presence or absence or the wave height of a step wave or a pulse wave converted from the step wave in response to the detection of radiation is determined for the signal from the radiation detector by using the learning model. The learning model is input with signal value sequence constituting the signal and outputs information related to the presence or absence or the wave height of the step wave or the pulse wave. The step wave or the pulse wave having small wave heights can be detected, and low-energy radiation can be detected.

In the signal processing method according to an aspect of the present disclosure, it is characterized in that the learning model uses a recurrent neural network and is input with the signal values included in the signal value sequence sequentially, and when one signal value is input, the learning model outputs the information related to the presence or absence of the step wave or the pulse wave in the signal configured with the signal value sequence or the information related to the wave height of the step wave or the pulse wave in the signal.

In one mods of an aspect of the present disclosure, a recurrent neural network is used as a learning model. The learning model sequentially inputs with signal values, and each time one signal value is input, information related to presence or absence or a wave height of a step wave or a pulse wave can be output. By using the recurrent neural network, a configuration of outputting information related to the presence or absence of one pulse wave for one pulse wave included in a signal can be made, so that a configuration of a signal processing device can be simplified. Information according to a waveform of a signal configured with the signal value sequence including a plurality of signal values input to the learning model in the past can be also obtained.

In the signal processing method according to an aspect of the present disclosure, it is characterized in that, when the signal value sequence made of the plurality of signal values is collectively input, the learning model outputs the information related to the presence or absence of the step wave or the pulse wave in the signal configured with the signal value sequence or the information related to the wave height of the step wave or the pulse wave in the signal.

In an aspect of the present disclosure, the learning model is collectively input with signal value sequence made of a plurality of signal values and outputs information related to the presence or absence or the wave height of the step wave or the pulse wave. The presence or absence or the wave height of the step wave or the pulse wave can be determined for the signal configured with the signal value sequence.

In the signal processing method according to an aspect of the present disclosure, it is characterized in that the signal value sequence is normalized and, after that, collectively input into the learning model.

In an aspect of the present disclosure, the signal value sequence is normalized and, after that, collectively input to the learning model. By normalizing the signal value sequences, detection accuracy of the step wave or the pulse wave can be stabilized.

In the signal processing method according to an aspect of the present disclosure, it is characterized in that the learning model outputs information indicating whether or not the step wave or the pulse wave is included in the signal, wherein measuring the wave height of the step wave or the pulse wave when information indicating that the step wave or the pulse wave is included in the signal is output from the learning model.

In an aspect of the present disclosure, the learning model is input with signal value sequence constituting the signal and outputs the information indicating whether or not the step wave or the pulse wave is included in the signal. When the step wave or the pulse wave is included in the signal, the wave height of the step wave or the pulse wave is measured. The step wave or the pulse wave in the signal can be detected.

A learning model generating method, according to an aspect of the present disclosure, is characterized by comprising: acquiring a plurality of time-series first signal value sequences each constituting a signal including a step wave in response to detection of radiation or a pulse wave obtained by converting the step wave and a plurality of time-series second signal value sequences each constituting a signal that not including any one of the step wave and the pulse wave; and generating a learning model by using the first signal value sequences, information indicating that there is the step wave or the pulse wave or information indicating a wave height of the step wave or the pulse wave in association with the first signal value sequences, the second signal value sequences, and information indicating that there is no step wave or no pulse wave or information indicating that the wave height of the step wave or the pulse wave is zero in association with the second signal value sequences as training data, the learning model outputting information related to presence or absence of the step wave or the pulse wave in a signal configured with arbitrary signal value sequence or information related to the wave height of the step wave or the pulse in the signal when being input with the arbitrary time-series signal value sequence.

In an aspect of the present disclosure, the learning model is learned in which the first signal value sequence including the step wave or the pulse wave and the second signal value sequence not including the step wave and the pulse wave are used as training data. The learning model which are input with signal value sequence and outputs information related to the presence or absence or the wave height of the step wave or the pulse wave can be generated.

In the learning model generating method according to an aspect of the present disclosure, it is characterized in that, when arbitrary signal value sequence made of a plurality of signal values is collectively input, the learning model outputs information indicating whether or not the step wave or the pulse wave is included in the signal configured with the arbitrary signal value sequence, and the first signal value sequences are normalized.

In an aspect of the present disclosure, the learning model is generated in which signal value sequence made of a plurality of signal values is collectively input and information related to the presence or absence or the wave height of the step wave or the pulse wave is output. The first signal value sequence used as the training data is normalized. Due to performing the normalization, there is no need to handle step waves or pulse waves of various sizes.

A signal processing device according to an aspect of the present disclosure, counting step waves in response to detection of radiation or pulse waves converted from the step waves by wave height, is characterized by comprising: a learning model outputting information related to presence or absence of the step wave or the pulse wave in a signal configured with time-series signal value sequence or information related to a wave height of the step wave or the pulse wave in the signal when the signal value sequence is input; and a counting unit counting the step wave or the pulse wave by wave height according to the information output by the learning model when the signal value sequences in response to the detection of the radiation is input to the learning model.

In an aspect of the present disclosure, the signal processing device determines the presence or absence or the wave height of the step wave or the pulse wave converted from the step wave in response to the detection of radiation, for the signal from the radiation detector by using the learning model. The signal processing device can count the step wave or the pulse wave included in the signal by wave height. The step wave or the pulse wave having a small wave height can be counted, and the radiation with low energy can be detected.

A radiation detecting device according to an aspect of the present disclosure, is characterized by comprising: a radiation detector outputting a step wave according to energy of radiation when detecting the radiation; a converting unit converting the step wave into a pulse wave; a learning model outputting, when time-series signal value sequence constituting a signal before the conversion by the converting unit or after the conversion by the converting unit is input, information indicating whether or not the step wave or the pulse wave is included in the signal; a wave height measuring unit measuring a wave height of the pulse wave when information indicating that the step wave or the pulse wave is included in the signal is output from the learning model; a counting unit counting the pulse waves by wave height; and a spectrum generating unit generating a spectrum of the radiation according to the wave height and the number of counts of the pulse waves.

In an aspect of the present disclosure, the radiation detecting device converts a step wave included in a signal from the radiation detector into a pulse wave, determines the presence or absence of the pulse wave in the signal by using the learning model, detects the wave height of the pulse wave, and counts the pulse wave by wave height. The radiation detecting device can count the pulse wave by wave height.

A radiation detecting device according to an aspect of the present disclosure, is characterized by comprising: a radiation detector outputting step waves according to energy of radiation when detecting the radiation; a learning model outputting, when time-series signal value sequence constituting a signal output from the radiation detector is input, the information indicating the wave height of the step wave in the signal; a counting unit counting the step waves by wave height according to the information output by the learning model; and a spectrum generating unit generating a spectrum of the radiation according to the wave height and the number of counts of the step waves.

In one mode of an aspect of the present disclosure, the radiation detecting device inputs the step wave included in the signal from the radiation detector to the learning model and determines the wave height of the step wave in the signal by using the learning model. The radiation detecting device can count the step wave by wave height.

A computer program according to an aspect of the present disclosure, is characterized by causing a computer to execute processing of: inputting signal value sequence in response to the detection of the radiation to a learning model which outputting, when time-series signal value sequence is input, information related to presence or absence of the step wave or the pulse wave in a signal configured with the signal value sequence or information related to a wave height of the step wave or the pulse wave in the signal; and outputting the information related to the presence or absence of the step wave or the pulse wave or the information related to the wave height.

In an aspect of the present disclosure, the presence or absence of the step wave or the pulse wave converted from the step wave in response to the detection of radiation is determined for the signal from the radiation detector by using the learning model by processes using the computer program. By detecting the step wave or the pulse wave having small wave heights, low-energy radiation can be detected.

In an aspect of the present disclosure, low-energy radiation can be detected. For this reason, an aspect of the present disclosure exhibits excellent effects such as being able to detect light elements having low-energy radiation.

The above and further objects and features will more fully be apparent from the following detailed description with accompanying drawings.

BRIEF DESCRIPTION OF DRAWINGS

FIG. 7 is a flowchart illustrating a procedure of processes generating the learning model.

FIG. 17 is a flowchart illustrating a procedure of processes executed by a signal processing device according to the fourth embodiment.

Hereinafter, the present disclosure will be specifically described with reference to drawings illustrating embodiments thereof.

FIRST EMBODIMENT

Figure 1:
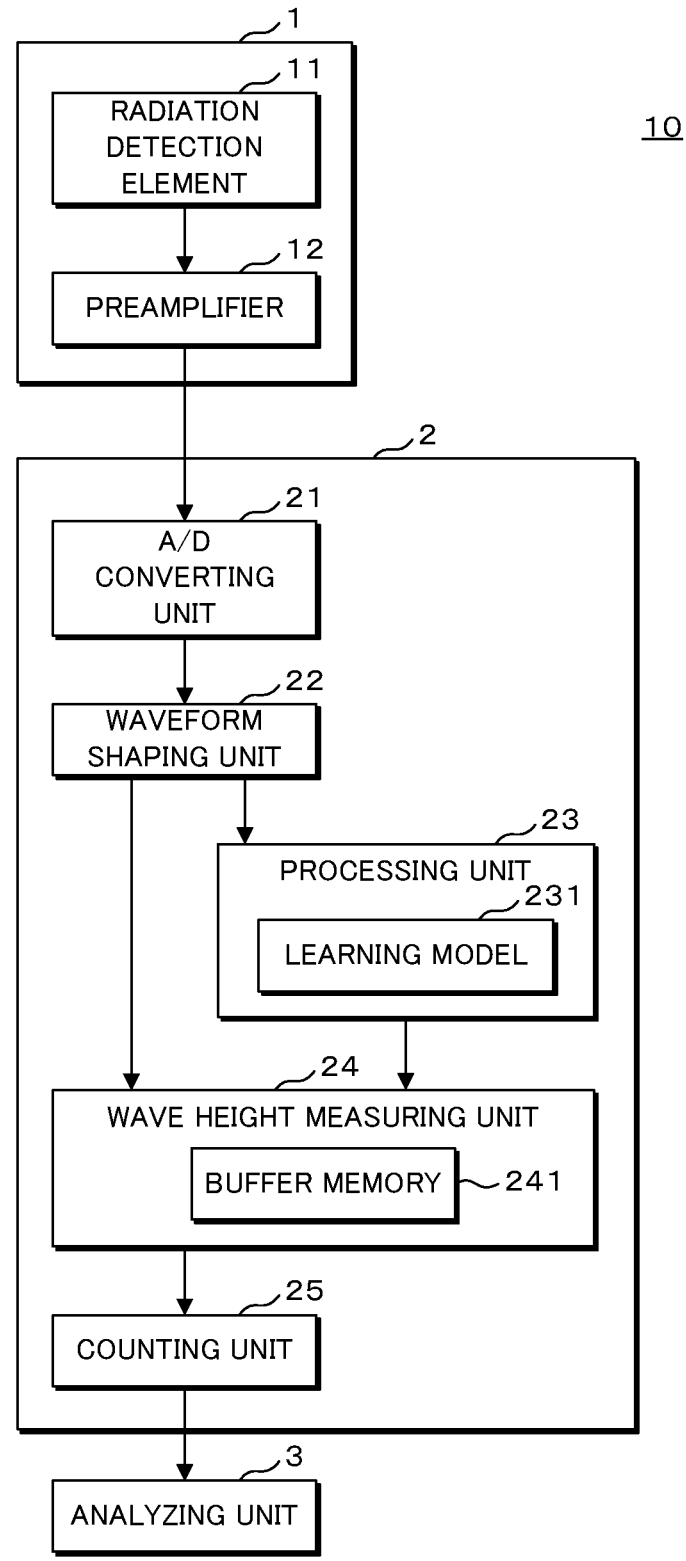
FIG. 1 is a block diagram illustrating a functional configuration of a radiation detecting device according to a first embodiment.

FIG. 1 is a block diagram illustrating a functional configuration of a radiation detecting device 10 according to a first embodiment. For example, the radiation detecting device 10 is a fluorescent X-ray analyzer. The radiation detecting device 10 includes a radiation detector 1, a signal processing device 2, and an analyzing unit 3. The radiation detector 1 includes a radiation detection element 11 and a preamplifier 12. The radiation detection element 11 generates electric charges according to energy of incident radiation, and outputs a current signal according to generated electric charges. For example, the radiation detection element 11 is a semiconductor radiation detection element such as a silicon drift detector (SDD). A preamplifier 12 converts the current signal output by the radiation detection element 11 into a voltage signal, and generates a step wave in which a signal value rises in a step shape of one layer at a time of radiation detection. The radiation detector 1 outputs a signal including the step wave generated by the preamplifier 12.

The signal output by the radiation detector 1 is input to the signal processing device 2. The signal processing device 2 executes a signal processing method. The signal processing device 2 includes an analog/digital (A/D) converting unit 21.

The A/D converting unit 21 receives a signal including the step wave from the radiation detector 1 and performs A/D conversion of the signal including the step wave. The A/D converting unit 21 generates discrete signal values by receiving a continuous signal, sampling the signal, and performing A/D conversion of values obtained by the sampling. The A/D converting unit 21 repeats generation of the signal values and sequentially outputs the signal values. In this manner, the A/D converting unit 21 outputs a time-series signal value sequence including the plurality of signal values. The signal after the A/D conversion by the A/D converting unit 21 becomes a signal configured with the discrete, time-series signal value sequence.

A waveform shaping unit 22 is connected to the A/D converting unit 21. The waveform shaping unit 22 is input with the signal configured with the time-series signal value sequence from the A/D converting unit 21. The waveform shaping unit 22 shapes the waveform of the signal by passing the signal through a predetermined filter, so that the step wave included in the signal is converted into a pulse wave. The filter used by the waveform shaping unit 22 is, for example, a differential filter or a trapezoidal shaping filter. By the process in the waveform shaping unit 22, the step wave is converted into the pulse wave, noise included in the signal is reduced, and thus, predetermined amplification is performed. The waveform shaping unit 22 outputs the signal. The signal output by the waveform shaping unit 22 includes the pulse wave in response to the detection of radiation by the radiation detector 1. The waveform shaping unit 22 corresponds to a converting unit.

Figure 2A:
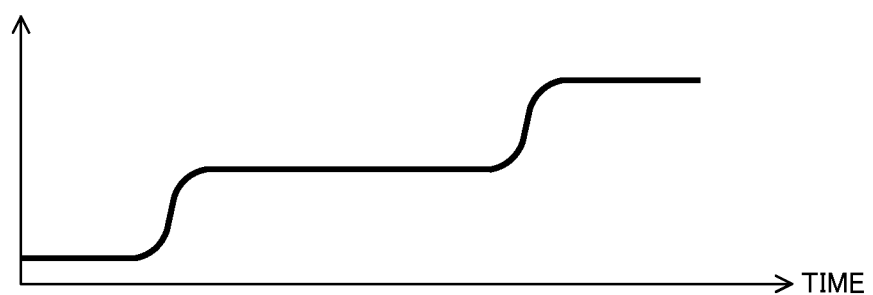
FIG. 2A is a schematic characteristic diagram illustrating an example of a step wave and a pulse wave.
Figure 2B:
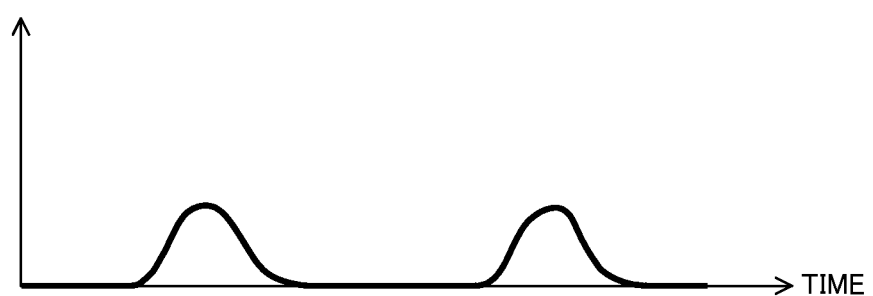
FIG. 2B is a schematic characteristic diagram illustrating an example of a step wave and a pulse wave.

FIGS. 2A and 2B are schematic characteristic diagrams illustrating examples of the step wave and the pulse wave. In the figure, the horizontal axis represents a time, and the vertical axis represents a signal value. FIG. 2A illustrates the signal including the step wave output by the radiation detector 1. The radiation detector 1 outputs the step wave of which signal value rises in a step shape of one layer each time when a radiation is detected. In response to detection of a radiation once, a single step wave is generated in which the signal value rises in a step shape of one layer. When the radiation detector 1 detects the radiation multiple times, the signal including the plurality of step waves is output. Each time when the radiation is detected, the signal value is increased. The wave height of the step in which the signal value rises is defined as a wave height of the step wave. The wave height of the step wave corresponds to the energy of the radiation. In reality, the step wave is not completely in a step shape, and rising and rounding is included in the signal waveform. The rising is distortion of the signal waveform when the signal value rises from a reference value, and the rounding is distortion of the signal waveform when the step wave ends.

FIG. 2B illustrates a signal obtained by converting the signal illustrated in FIG. 2A by the waveform shaping unit 22. The step wave is converted into the pulse wave. The pulse wave is a signal in which the signal value rises from a predetermined signal reference at which the signal value becomes zero to a peak value and then falls to the signal reference. The signal reference is, for example, zero. A height from the signal reference to the peak value is defined as a wave height of the pulse wave. The wave height of the pulse wave corresponds to the energy of the radiation. A shape of the pulse wave includes rising and rounding. The rising is the distortion of the signal waveform when the signal value rises from the reference value, and the rounding is the distortion of the signal waveform when the pulse wave ends.

A processing unit 23 and a wave height measuring unit 24 are connected to the waveform shaping unit 22. The waveform shaping unit 22 inputs the signal to the processing unit 23 and the wave height measuring unit 24. The processing unit 23 is input with the signal from the waveform shaping unit 22 and performs the process of determining whether or not the pulse wave is included in the signal. The processing unit 23 includes a learning model 231 for determining the presence or absence of the pulse wave. For example, the learning model 231 is configured by using a field-programmable gate array (FPGA). When the pulse wave is included in the signal input from the waveform shaping unit 22, the processing unit 23 outputs the information indicating that the pulse wave is included. A method for determining the presence or absence of the pulse wave will be described later.

The processing unit 23 is connected to the wave height measuring unit 24. The wave height measuring unit 24 is input with the signal from the waveform shaping unit 22, and the information indicating that the pulse wave is included in the signal is input from the processing unit 23. The wave height measuring unit 24 includes a buffer memory 241. The wave height measuring unit 24 measures the wave height of the pulse wave included in the signal input from the waveform shaping unit 22 when the information indicating that the pulse wave is included in the signal is input from the processing unit 23.

A counting unit 25 is connected to the wave height measuring unit 24. The wave height measuring unit 24 inputs the measured wave height of the pulse wave to the counting unit 25. The counting unit 25 counts pulse waves by wave height. For example, the counting unit 25 is a multi-channel analyzer. The counting unit 25 may have a form of counting the pulse wave for all the wave heights or may have a form of counting the pulse wave only for a specific wave height. The signal processing device 2 outputs data representing a relationship between the wave height of the pulse wave and the number of counts counted by the counting unit 25. The number of counts corresponds to the number of times of detection which the radiation detector 1 performs on the radiation having energy corresponding to the wave height of the pulse wave.

The analyzing unit 3 is configured with a computer such as a personal computer. The analyzing unit 3 is input with the data output by the signal processing device 2. The analyzing unit 3 performs a process of generating a spectrum of the radiation detected by the radiation detector 1 from a relationship between the wave height of the pulse wave and the number of counts. The analyzing unit 3 corresponds to a spectrum generating unit. The analyzing unit 3 may further perform a process such as an elemental analysis of a radiation source based on the generated spectrum of the radiation. For example, the radiation detector 1 detects fluorescent X-rays, and the analyzing unit 3 performs a qualitative analysis or a quantitative analysis of elements included in a sample based on the spectrum of fluorescent X-rays. It is noted that the signal processing device 2 may also have a function of generating the spectrum of the radiation.

Figure 3:
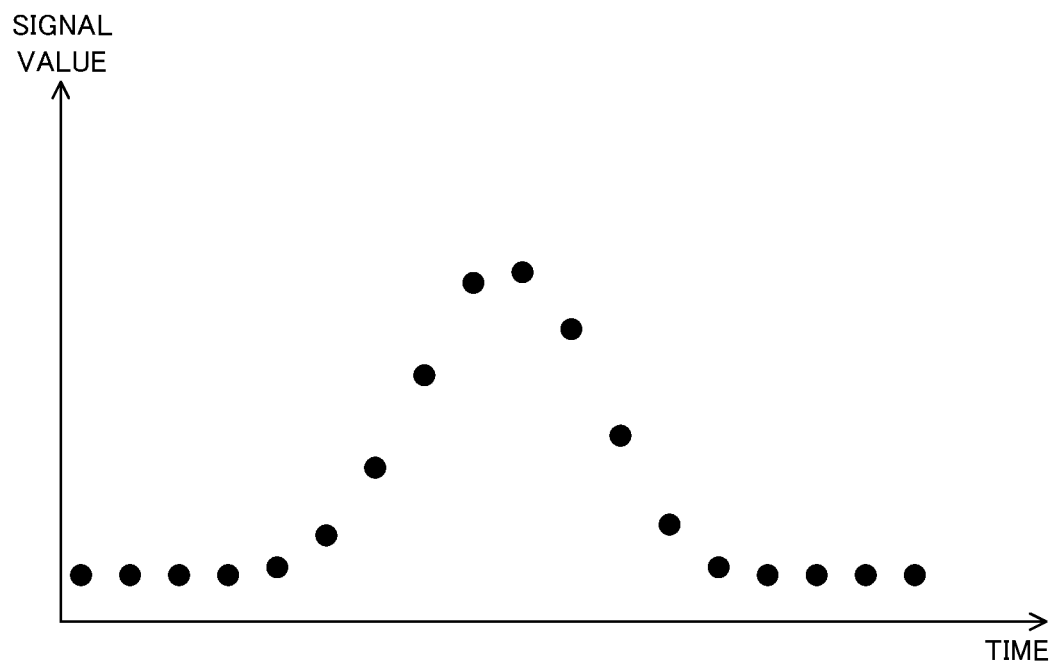
FIG. 3 is a graph schematically illustrating an example of a signal input to a processing unit.

The method of determining the presence or absence of the pulse wave in the processing unit 23 will be described. FIG. 3 is a graph schematically illustrating an example of a signal input to the processing unit 23. In the figure, the horizontal axis represents time, and the vertical axis represents signal values. The signal is configured with a sequence of discrete signal values obtained in time series at predetermined time intervals. That is, the signal is represented by the time-series signal value sequence. The learning model 231 according to the first embodiment is learned in advance so as to output information indicating whether or not the pulse wave is included in the signal when the signal values included in the signal value sequence constituting the signal are sequentially input.

Figure 4:
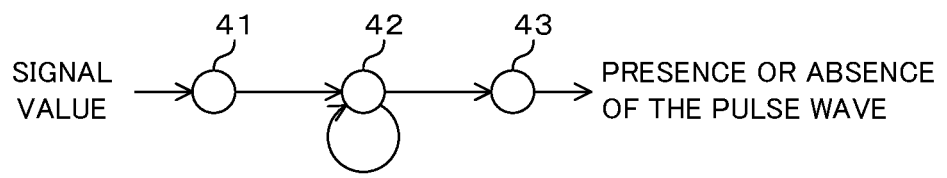
FIG. 4 is a conceptual diagram illustrating a functional configuration example of a learning model according to the first embodiment.

FIG. 4 is a conceptual diagram illustrating a functional configuration example of the learning model 231 according to the first embodiment. The learning model 231 uses a recurrent neural network (RNN). The learning model 231 includes a node 41 in an input layer, a node 42 in an intermediate layer, and a node 43 in an output layer. The signal values are sequentially input to the node 41 in the input layer. The node 41 in the input layer outputs data to the node 42 in the intermediate layer.

The node 42 in the intermediate layer receives data from the node 41 in the input layer and further feeds back the previous output. The node 42 in the intermediate layer performs calculation on the data received from the node 41 in the input layer and on the data fed back by using parameters, and outputs the data to the node 43 in the output layer. The node 43 in the output layer receives data from the node 42 in the intermediate layer, performs calculation on the received data by using parameters, and outputs the information indicating the presence or absence of the pulse wave. For example, the node 43 may output the value of 1 as the information indicating that there is a pulse wave and may output the value of zero as the information indicating that there is no pulse wave. The node 43 may output a probability that the pulse wave is included in the signal. The middle layer may have the plurality of nodes 42. The learning model 231 may have the plurality of intermediate layers.

Figure 5:
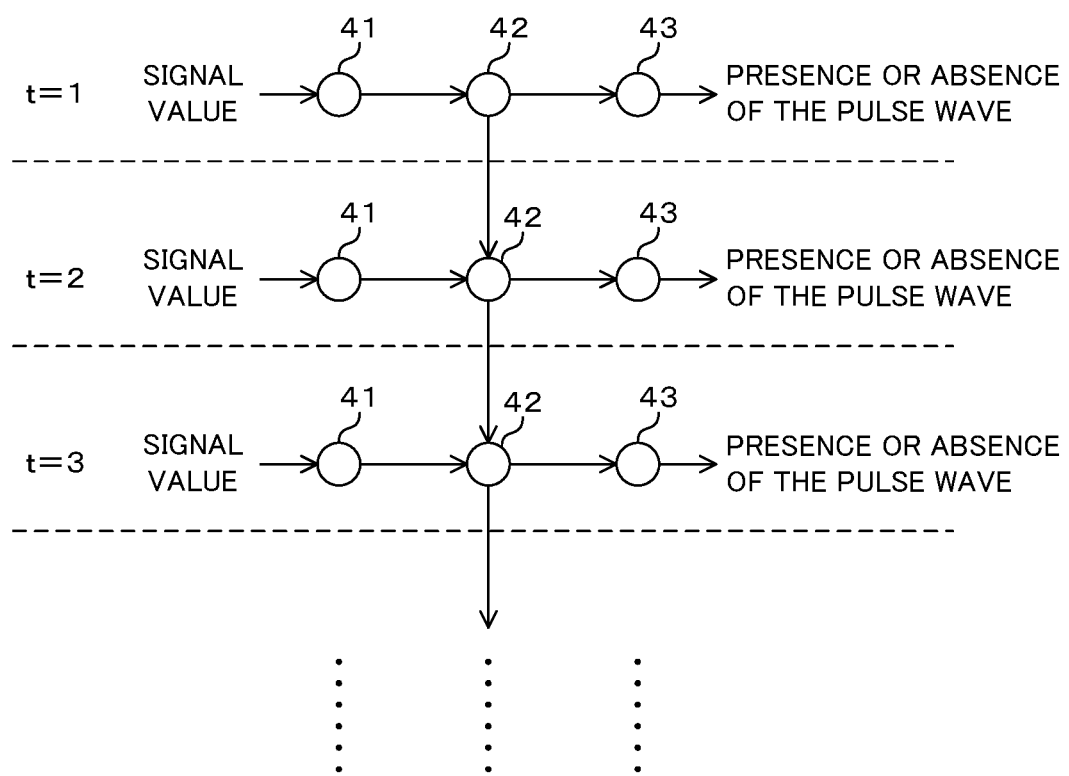
FIG. 5 is a schematic diagram illustrating an outline of sequential processes in the learning model.

FIG. 5 is a schematic diagram illustrating an outline of sequential processes in the learning model 231. At a time of t=1, the signal values are input to the node 41 in the input layer, the node 42 in the intermediate layer performs calculation, and the node 43 in the output layer outputs the information indicating the presence or absence of the pulse wave. At a next time of t=2, a next signal values are input to the node 41 in the input layer. The data from the node 41 in the input layer and the data output by the node 42 in the intermediate layer at a time of t=1 are input to the node 42 in the intermediate layer. The node 42 in the intermediate layer performs calculation, and the node 43 in the output layer outputs the information indicating the presence or absence of the pulse wave. At a next time of t=3, the next signal values are input to the node 41 in the input layer. The data from the node 41 in the input layer and the data output by the node 42 in the intermediate layer at a time of t=2 are input to the node 42 in the intermediate layer. The node 42 in the intermediate layer performs calculation, and the node 43 in the output layer outputs the information indicating the presence or absence of the pulse wave. In the learning model 231, the same processes are sequentially continued.

In this manner, the signal values are sequentially input to the learning model 231, and each time when the signal values are input, the learning model 231 outputs the information indicating the presence or absence of the pulse wave. All the signal values included in the signal value sequence constituting the signal input to the processing unit 23 may be sequentially input to the learning model 231. Alternatively, one signal value may be sequentially input to the learning model 231 for each predetermined number of signal values included in the signal value sequence constituting the signal input to the processing unit 23. The learning model 231 is learned in advance so as to determine whether or not the pulse wave is included in the signal configured with the signal value sequence made of the plurality of signal values including the input signal value. For example, when the predetermined number of signal values are sequentially input to the learning model 231 and the last signal value in the signal value sequence constituting the pulse wave is input, the learning model 231 outputs the information indicating whether or not the pulse wave is included in the signal configured with the signal value sequence made of the predetermined number of signal values. For example, the learning model 231 may output the information indicating that the pulse wave is included in the signal when the predetermined number of sequentially input signal values represent the rising of the pulse wave. It is noted that the learning model 231 may use a long short-term memory (LSTM).

Figure 6:
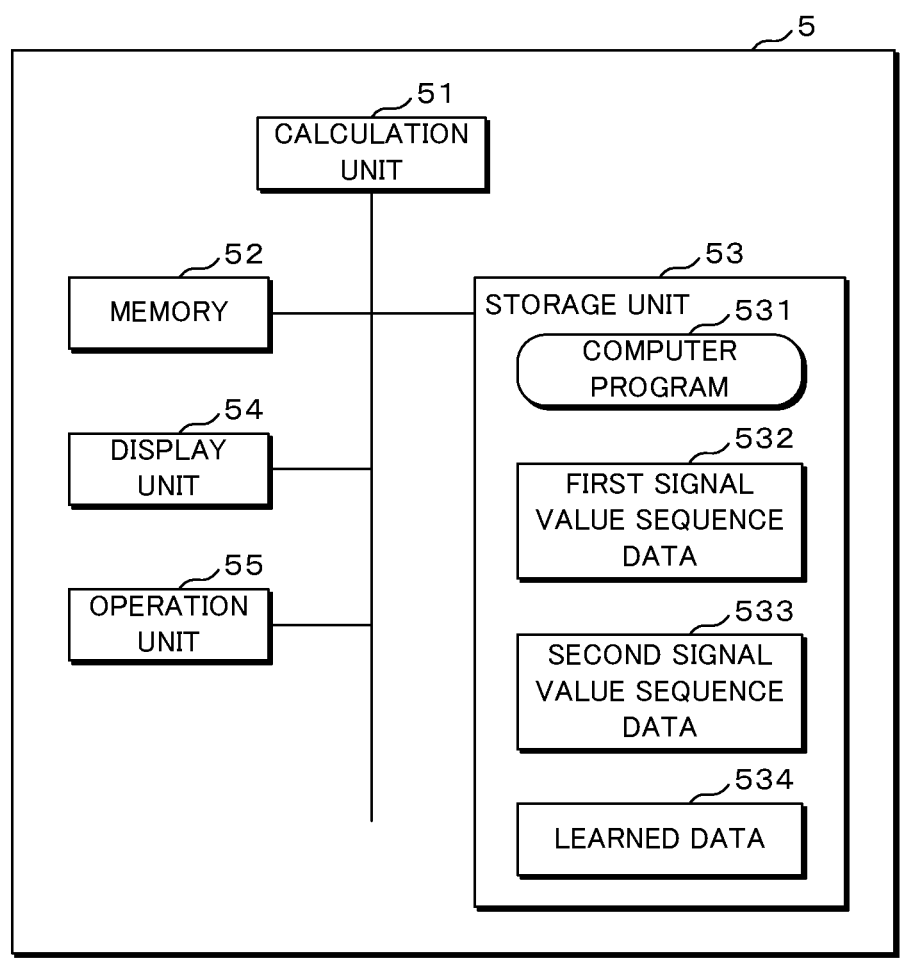
FIG. 6 is a block diagram illustrating a configuration example of a learning device that performs learning of the learning model.

The learning of the learning model 231 is performed by using the computer. FIG. 6 is a block diagram illustrating a configuration example of a learning device 5 that performs learning of the learning model 231. The learning device 5 executes a learning model generating method. The learning device 5 is a computer such as a server device. The learning device 5 includes a calculation unit 51, a memory 52, a storage unit 53, a display unit 54, and an operation unit 55. The calculation unit 51 is configured by using, for example, a central processing unit (CPU), a graphics processing unit (GPU), or a multi-core CPU. The calculation unit 51 may be configured by using a quantum computer. The memory 52 stores temporary data generated by calculation. The memory 52 is, for example, a random access memory (RAM). The storage unit 53 is a non-volatile storage device, for example, a hard disk. The display unit 54 is, for example, a liquid crystal display or an electroluminescent (EL) display. The operation unit 55 accepts an input of information such as a text by accepting an operation from a user. The operation unit 55 is, for example, a keyboard or a touch panel. The storage unit 53 stores a computer program 531. The calculation unit 51 executes processes according to the computer program 531.

FIG. 7 is a flowchart illustrating a procedure of processes for generating the learning model 231. Hereinafter, a step is abbreviated as S. The calculation unit 51 executes the following processes according to the computer program 531. The calculation unit 51 generates a plurality of time-series first signal value sequences each constituting the signal including the pulse wave and the noise (S11). In S11, the calculation unit 51 generates the pulse wave and the noise by simulation and generates the first signal value sequences constituting the signal in which noise is superimposed on the pulse wave. The calculation unit 51 generates the noise generated by an actual radiation detecting device, such as noise having a predetermined frequency. The calculation unit 51 generates the noise, as noise matching the noise generated by an actual radiation detecting device, such as noise having a predetermined frequency. The calculation unit 51 may use the noise actually generated by the actual radiation detecting device. The calculation unit 51 may generate the first signal value sequence by sampling from the signal actually generated by the actual radiation detecting device. The calculation unit 51 stores first signal value sequence data 532 including the generated plurality of first signal value sequences in the storage unit 53.

Next, the calculation unit 51 generates a plurality of time-series second signal value sequences each constituting the signal not including the pulse wave but including noise (S12). In S12, the calculation unit 51 generates the noise by simulation and generates the second signal value sequences constituting the signal including noise. The calculation unit 51 generates the noise, as noise matching the noise generated by the actual radiation detecting device. The calculation unit 51 may use the noise actually generated by the actual radiation detecting device. The calculation unit 51 may generate the second signal value sequences by sampling from the signal actually generated by the actual radiation detecting device. The calculation unit 51 stores second signal value sequence data 533 including the generated plurality of second signal value sequences in the storage unit 53.

Next, the calculation unit 51 associates the information indicating the presence or absence of the pulse wave with the first signal value sequence and the second signal value sequence (S13). In S13, the calculation unit 51 associates the information indicating that the pulse wave is included in the signal with the first signal value sequence and associates the information indicating that the pulse wave is not included in the signal with the second signal value sequence. When the user operates the operation unit 55, the information indicating the presence or absence of the pulse wave may be input and stored in the storage unit 53 in association with the first signal value sequence and the second signal value sequence, and by reading the information stored in association with the first signal value sequence and the second signal value sequence, the calculation unit 51 may associates the information indicating the presence or absence of the pulse wave with the first signal value sequence and the second signal value sequence. In S13, when the user operates the operation unit 55, the information indicating the presence or absence of the pulse wave may be associated with the first signal value sequence and the second signal value sequence.

Next, the calculation unit 51 performs a process of generating the learning model 231 by using the plurality of first signal value sequences included in the first signal value sequence data 532, the information associated with the first signal value sequences, the plurality of second signal value sequences included in the second signal value sequence data 533, and the information associated with the second signal value sequences as training data (S14). In S14, the calculation unit 51 sequentially inputs the signal values included in the plurality of first signal value sequences and the plurality of second signal value sequences to the input layer of the learning model 231. The signal values included in the first signal value sequence or the second signal value sequence are sequentially input to the node 41 in the input layer. After the signal values included in the first signal value sequence or the second signal value sequence are sequentially input, the information indicating whether or not the pulse wave is included in the signal is output from the node 43 in the output layer by the learning model 231. The calculation unit 51 calculates an error of the information by an error function having variables which are the information with the information associated with the first signal value sequence or the second signal value sequence and the information output from the node 43, and adjusts the parameters of the operations in the nodes 41, 42, and 43 of the learning model 231 according to an error back propagation method so that the error is minimized. That is, the parameters are adjusted so that the information indicating that the pulse wave is included in the signal is substantially output when the signal values included in the first signal value sequence are sequentially input and the information indicating that the pulse wave is not included in the signal is substantially output when the signal values included in the second signal value sequence are sequentially input.

The calculation unit 51 performs the machine learning of the learning model 231 by repeating the process by using the plurality of first signal value sequences and the plurality of second signal value sequences and adjusting the parameters of each node of the learning model 231. The learning model 231 may be learned to output the information indicating that the pulse wave is included in the signal when the signal value corresponding to the rising edge of the pulse wave is input. The learning model 231 may be learned to output the information indicating that the pulse wave is included in the signal when the signal value after the end of the pulse wave is input. The learning model 231 may be learned to output the information indicating that the pulse wave is included in the signal when the corresponding signal value in the middle of the pulse wave is input. The calculation unit 51 stores learned data 534 in which the adjusted final parameters are recorded in the storage unit 53. In this manner, the learned learning model 231 is generated. After the end of S14, the calculation unit 51 ends the process. The learning model 231 included in the processing unit 23 is manufactured based on the learned data 534. For example, the learning model 231 is manufactured by writing the parameters recorded in the learned data 534 to the FPGA included in the processing unit 23.

Figure 8:
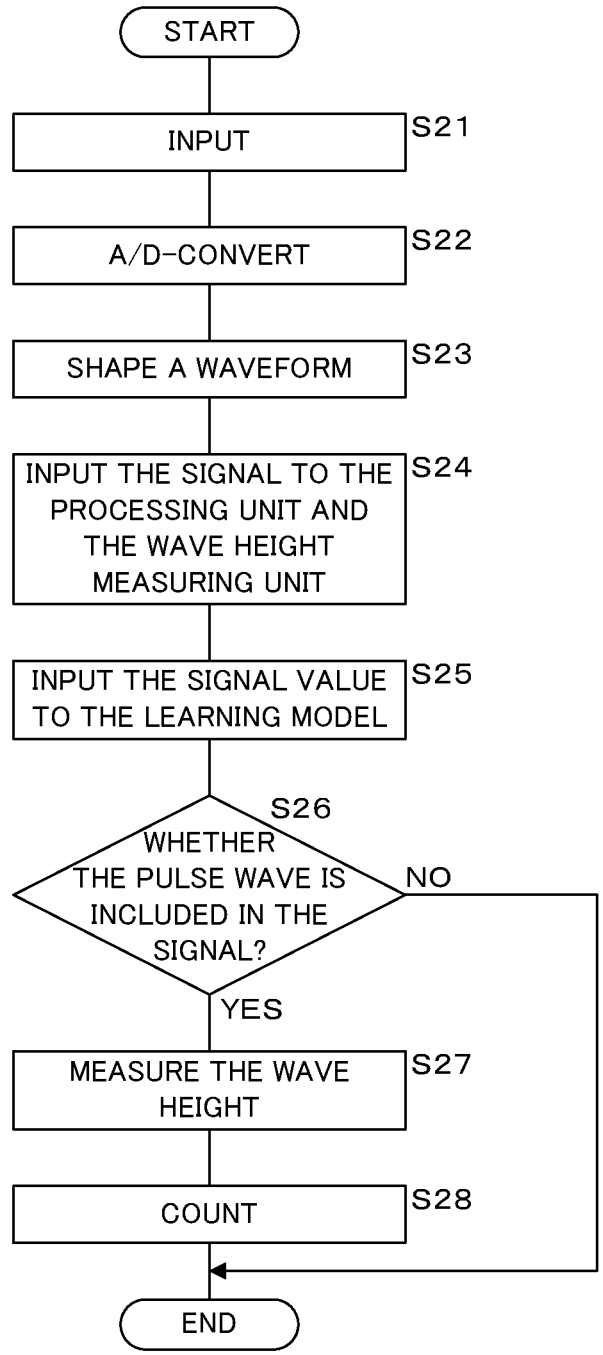
FIG. 8 is a flowchart illustrating a procedure of processes executed by a signal processing device according to the first embodiment.

Next, the processes executed by the signal processing device 2 will be described. FIG. 8 is a flowchart illustrating a procedure of processes executed by the signal processing device 2 according to the first embodiment. When radiation is incident on the radiation detection element 11, the radiation detector 1 generates the step wave according to the energy of the radiation and outputs the signal including the step wave. Even if the radiation is not detected, the radiation detector 1 outputs the signal. The signal processing device 2 is input with the signal from the radiation detector 1 (S21). The A/D converting unit 21 A/D-converts the input signal (S22). The A/D converting unit 21 inputs the A/D-converted signal to the waveform shaping unit 22. The waveform shaping unit 22 shapes a waveform of the input signal (S23). By the waveform shaping, the waveform shaping unit 22 reduces the noise included in the signal and converts the step wave included in the signal into the pulse wave. The waveform shaping unit 22 inputs the shaped signal to the processing unit 23 and the wave height measuring unit 24 (S24).

The signal input from the waveform shaping unit 22 is configured with the time-series signal value sequence. The wave height measuring unit 24 sequentially stores signal values in the buffer memory 241. The processes of S21 to S24 are individually and repeatedly executed, and the signal values are sequentially stored in the buffer memory 241. The buffer memory 241 is a first-in first-out memory and stores a plurality of sequentially input signal values. When the new signal value is input in a state where an amount of the plurality of signal values stored in the buffer memory 241 reached an upper limit, the buffer memory 241 erases the signal value firstly stored among the plurality of stored signal values and stores the new signal value.

The processing unit 23 sequentially inputs the signal values included in the signal value sequence to the learning model 231 (S25). The processing unit 23 may input one signal value to the learning model 231 for each predetermined number of signal values included in the signal value sequence. As described above, the learning model 231 to which the signal value is input performs the calculation of the recurrent neural network and outputs the information indicating whether or not the pulse wave is included in the signal configured with the signal value sequence (S26). By the calculation of the recurrent neural network, the learning model 231 can determine whether or not the pulse wave is included in the signal configured with the signal value sequence made of the plurality of signal values input in the past.

When the learning model 231 outputs the information indicating that the pulse wave is included in the signal (YES in S26), the processing unit 23 inputs the information indicating that the pulse wave is included in the signal to the wave height measuring unit 24. When the information indicating that the pulse wave is included in the signal is input, the wave height measuring unit 24 reads the signal value sequence constituting the signal including the pulse wave from the buffer memory 241. For example, the wave height measuring unit 24 reads the signal value sequence made of a predetermined number of signal values including the signal values input before a predetermined time from the time when the information is input or the signal values input before a predetermined number from the latest signal value. The predetermined time or the predetermined number is determined in advance according to a processing time required by the processing unit 23. Alternatively, the wave height measuring unit 24 may read the signal value sequence after waiting for the predetermined time until the signal value sequence required for measuring the wave height is stored in the buffer memory 241. The processing unit 23 may input the information indicating that the pulse wave is included in the signal to the wave height measuring unit 24 after waiting for a predetermined time until the signal value sequence required for measurement of the wave height is stored in the buffer memory 241. The wave height measuring unit 24 measures the wave height of the pulse wave included in the signal configured with the read signal value sequence (S27). The wave height measuring unit 24 inputs the measured wave height of the pulse wave to the counting unit 25.

The counting unit 25 counts pulse waves by wave height input from the wave height measuring unit 24 (S28) and ends the process. When the learning model 231 outputs the information indicating that the pulse wave is not included in the signal (NO in S26), the processing unit 23 ends the process. The processing unit 23 may input the information indicating that the pulse wave is not included in the signal to the wave height measuring unit 24. The signal processing device 2 individually repeatedly executes the processes of S21 to S28.

The signal processing device 2 outputs the data representing the relationship between the wave height of the pulse wave and the number of counts counted by the counting unit 25. The analyzing unit 3 is input with the data output by the signal processing device 2 and generates the spectrum of the radiation detected by the radiation detector 1 based on the data. The analyzing unit 3 may perform an analysis based on the generated spectrum. For example, the analyzing unit 3 performs the elemental analysis based on the spectrum of fluorescent X-rays.

As described above in detail, in the present embodiment, the signal processing device 2 determines the presence or absence of the pulse wave in the signal from the radiation detector 1 by using the learning model 231. Accordingly, the signal processing device 2 can determine the presence or absence of the pulse wave. For this reason, the pulse wave having a small wave height that could not be detected by a method of the related art can be detected. In addition, the wave height of the pulse wave having a small wave height that could barely be detected by a method of the related art can be reliably measured, and measurement accuracy of the wave height is improved. By detecting the pulse wave having a small wave height, the radiation detecting device 10 can detect the radiation having low energy and count the radiation. When the radiation detecting device 10 detects fluorescent X-rays, light elements having low fluorescent X-ray energy can be detected by the elemental analysis. For example, the element having an atomic number smaller than that of oxygen can be detected.

Further, in this embodiment, the recurrent neural network is used as the learning model 231. Accordingly, the processing unit 23 can be configured to output the information related to the presence or absence of one pulse wave for one pulse wave included in the signal, so that the configuration of the signal processing device 2 can be simplified. Further, the signal processing device 2 can obtain not only the information related to the wave height but also the information according to the waveform of the signal configured with the signal value sequence by using the recurrent neural network. For example, a possibility that the pulse wave is a pulse wave corresponding to an escape peak or a sum peak having erroneous energy can be obtained. By obtaining the information according to the waveform of the signal, the radiation detecting device 10 can generate the spectrum of the radiation with higher accuracy.

Second Embodiment

Figure 9:
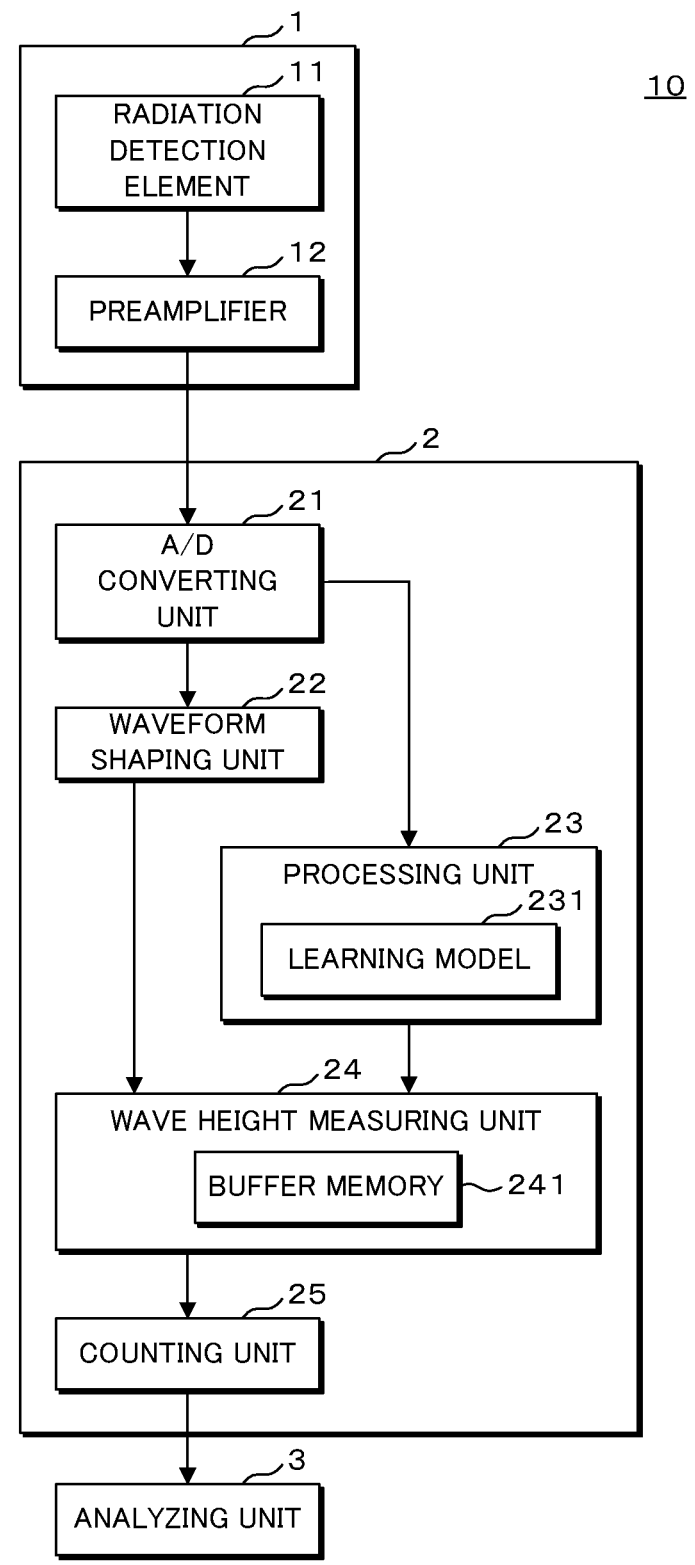
FIG. 9 is a block diagram illustrating a functional configuration of a radiation detecting device according to a second embodiment.

In a second embodiment, a mode is illustrated in which a learning model 231 determines presence or absence of a step wave. The presence or absence of the step wave denotes whether or not a portion where a signal value rises in a stepwise shape is included in the signal. FIG. 9 is a block diagram illustrating a functional configuration of a radiation detecting device 10 according to the second embodiment. Configurations and functions of a radiation detector 1 and an analyzing unit 3 are the same as those in the first embodiment. A processing unit 23 is connected to an A/D converting unit 21. The A/D converting unit 21 inputs a signal to the waveform shaping unit 22 and the processing unit 23. The waveform shaping unit 22 inputs the signal to the wave height measuring unit 24. The processing unit 23 is input with the signal from the A/D converting unit 21 and performs a process of determining whether or not the step wave is included in the signal. The processing unit 23 includes a learning model 231 for determining the presence or absence of the step wave. For example, the learning model 231 is configured by using FPGA. When the step wave is included in the signal input from the A/D converting unit 21, the processing unit 23 outputs information indicating that the step wave is included.

The signal input from the A/D converting unit 21 to the processing unit 23 is represented by the time-series signal value sequence. The learning model 231 according to the second embodiment is learned in advance so as to output information indicating whether or not the step wave is included in the signal when the signal values included in the signal value sequence constituting the signal are sequentially input.

Figure 10:
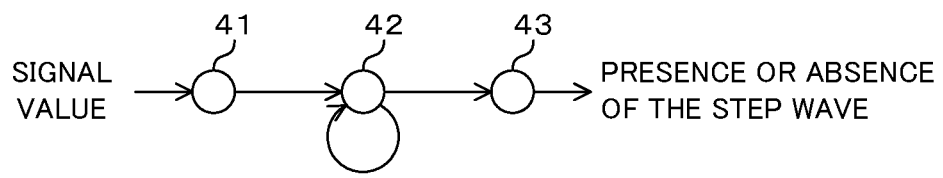
FIG. 10 is a conceptual diagram illustrating a functional configuration example of a learning model according to the second embodiment.

FIG. 10 is a conceptual diagram illustrating a functional configuration example of the learning model 231 according to the second embodiment. Similarly to the first embodiment, the learning model 231 uses the RNN. Signal values are sequentially input to the node 41 in the input layer. The node 42 in the intermediate layer receives data from the node 41 in the input layer, and further feeds back the previous output. The node 43 in the output layer receives data from the node 42 in the intermediate layer, performs calculation on the received data by using parameters, and outputs the information indicating the presence or absence of the step wave. For example, the node 43 may output the value of 1 as the information indicating that there is a step wave, and may output the value of zero as the information indicating that there is no step wave. The node 43 may output a probability that the step wave is included in the signal.

Similarly to the first embodiment, the learning model 231 executes sequential processes and outputs the information indicating the presence or absence of the step wave each time when the signal value is input. All the signal values included in the signal value sequence constituting the signal may be sequentially input to the learning model 231, or one signal value may be sequentially input to the learning model 231 for each of the plurality of signal values. The learning model 231 is learned in advance so as to determine whether or not the step wave is included in the signal configured with the signal value sequence made of the plurality of signal values including the input signal value. The learning model 231 may use an LSTM.

The learning of the learning model 231 is performed by the learning device 5 similarly to the first embodiment. The learning device 5 executes the same processes as those of S11 to S14. In S11, the calculation unit 51 of the learning device 5 generates the plurality of time-series first signal value sequences each constituting the signal including the step wave and the noise. In S12, the calculation unit 51 generates the plurality of time-series second signal value sequences each constituting the signal not including the step wave but including the noise. In S13, the calculation unit 51 associates the information indicating that the step wave is included in the signal with the first signal value sequence and associates the information indicating that the step wave is not included in the signal with the second signal value sequences. In S14, the calculation unit 51 adjusts the parameters of the learning model 231 so that the information indicating that the step wave is included in the signal is substantially output when the signal values included in the first signal value sequence are sequentially input and the information indicating that the step wave is not included in the signal is substantially output when the signal values included in the second signal value sequence are sequentially input. The calculation unit 51 performs the machine learning of the learning model 231 by repeating the process by using the plurality of first signal value sequences and the plurality of second signal value sequences.

The signal processing device 2 executes the same processes as those of S21 to S28. In S24, the waveform shaping unit 22 inputs the signal value to the wave height measuring unit 24, and the A/D converting unit 21 inputs the signal value to the processing unit 23. In S25, the processing unit 23 inputs the signal value to the learning model 231, and the learning model 231 outputs the information indicating whether or not the step wave is included in the signal configured with the signal value sequence. In S26, when the learning model 231 outputs the information indicating that the step wave is included in the signal, the processing unit 23 inputs the information indicating that the step wave is included in the signal to the wave height measuring unit 24.

In S27, when the information indicating that the step wave is included in the signal is input, the wave height measuring unit 24 reads the signal value sequence constituting the signal in which the pulse wave is included from the buffer memory 241 and measures the wave height of the pulse wave included in the signal configured with the signal value sequence. The signal processing device 2 individually repeatedly executes the processes of S21 to S28. The signal processing device 2 outputs the data representing the relationship between the wave height of the pulse wave and the number of counts, and the analyzing unit 3 is input with the data output by the signal processing device 2 to generate the spectrum of the radiation detected by the radiation detector 1. The analyzing unit 3 may perform the elemental analysis of the radiation source based on the spectrum of the radiation.

As described above in detail, in the second embodiment, the signal processing device 2 inputs the signal value before shaping by the waveform shaping unit 22 to the learning model 231 and determines the presence or absence of the step wave in the signal from the radiation detector 1. The signal processing device 2 can determine the presence or absence of the step wave. For this reason, the step wave having a small wave height can be detected. By detecting the step wave having a small wave height, the radiation detecting device 10 can detect the radiation having low energy and count the radiation. When the radiation detecting device 10 detects fluorescent X-rays, light elements having low fluorescent X-ray energy can be detected by the elemental analysis. Further, by using the recurrent neural network as the learning model 231, the processing unit 23 can be configured to output the information related to the presence or absence of one step wave for one step wave included in the signal. For this reason, the configuration of the signal processing device 2 can be simplified.

The signal processing device 2 may have a form in which the waveform shaping unit 22 is not used. In this embodiment, the wave height measuring unit 24 receives the signal from the A/D converting unit 21, and when the information indicating that the step wave is included in the signal is input from the processing unit 23, the wave height measuring unit 24 measures the wave height of the step wave. The counting unit 25 counts the step waves by wave height. The counting of the step waves denotes counting the number of portions of the signal where the signal value rises.

Third Embodiment

Figure 11:
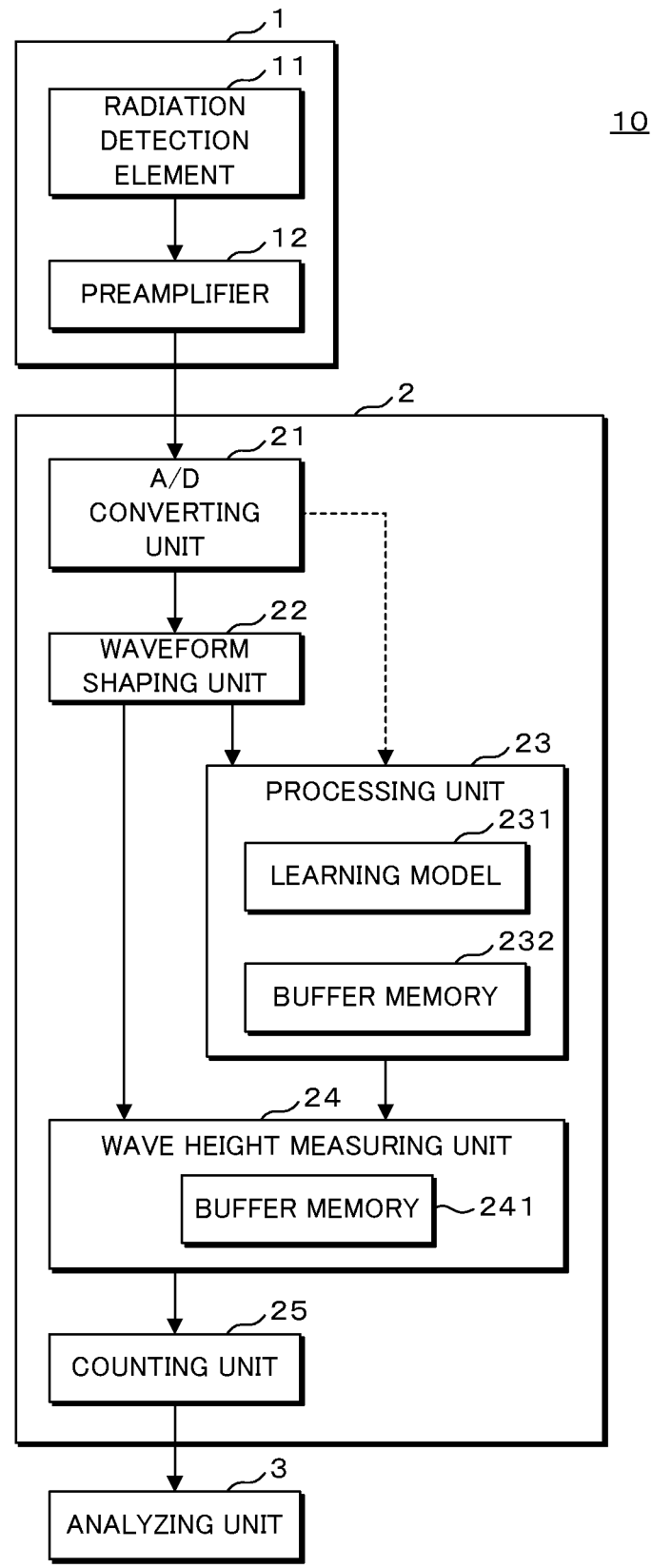
FIG. 11 is a block diagram illustrating a functional configuration of a radiation detecting device according to a third embodiment.

In a third embodiment, a form in which signal sequence are collectively input to a learning model is illustrated. FIG. 11 is a block diagram illustrating a functional configuration of a radiation detecting device 10 according to the third embodiment. Configurations and functions of a radiation detector 1 and an analyzing unit 3 are the same as those in the first embodiment. Configurations and functions of an A/D converting unit 21, a waveform shaping unit 22, a wave height measuring unit 24, and a counting unit 25 are the same as those in the first embodiment. The processing unit 23 includes a learning model 231 for determining the presence or absence of the pulse wave and a buffer memory 232. For example, the learning model 231 is configured by using FPGA. The buffer memory 232 is a first-in first-out memory and stores a plurality of sequentially-input signal values. When a new signal value is input in a state where an amount of the plurality of signal values stored in the buffer memory 232 reaches an upper limit, the buffer memory 232 erases the signal value firstly stored among the plurality of stored signal values and stores the new signal value.

The processing unit 23 is input with the signal from the waveform shaping unit 22 and performs a process of determining whether or not the pulse wave is included in the signal. The input signal is represented by the time-series signal value sequence. The processing unit 23 stores the plurality of signal values included in the signal value sequence constituting the input signal in the buffer memory 232. The processing unit 23 collectively inputs the signal value sequence made of the plurality of signal values stored in the buffer memory 232 to the learning model 231. The learning model 231 according to the third embodiment is learned in advance so as to output the information indicating whether or not the pulse wave is included in the signal configured with the input signal value sequence when the signal value sequence is collectively input.

Figure 12:
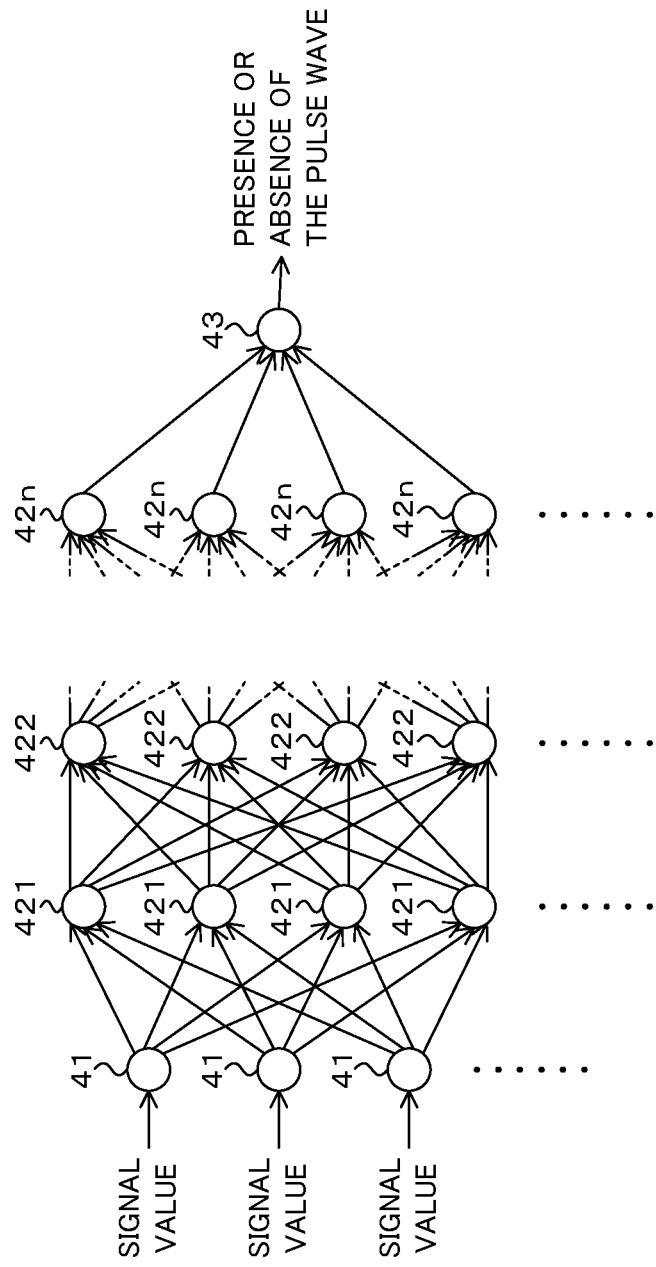
FIG. 12 is a conceptual diagram illustrating a functional configuration example of a learning model according to the third embodiment.

FIG. 12 is a conceptual diagram illustrating a functional configuration example of the learning model 231 according to the third embodiment. The learning model 231 uses the fully coupled neural network with an input layer, a plurality of intermediate layers and an output layer, each layer having a plurality of nodes. The input layer has a plurality of nodes 41 to which a plurality of signal values included in the signal value sequence are input. One signal value in the signal value sequence is input to one node 41, and each signal value is input to any one of the nodes 41. For example, m nodes 41 are included in the input layer, and m signal values are input to the input layer. That is, a plurality of signal values included in the signal value sequence are input in parallel to the plurality of nodes 41 included in the input layer. In this manner, the signal value sequence made of the plurality of signal values is collectively input to the learning model 231.

The learning model 231 has n (n is a natural number) intermediate layers. A first intermediate layer has a plurality of nodes 421. Each node 41 in the input layer outputs data to the plurality of nodes 421. The plurality of nodes 421 receive data from the node 41 in the input layer, perform calculation on by using parameters and output data of the calculation result to a plurality of nodes 422 included in a second intermediate layer. The node included in each intermediate layer receives data from the plurality of nodes in the previous intermediate layer, performs calculation on the received data by using parameters, and outputs the data to nodes in the subsequent intermediate layer. For example, the node performs calculation of $f(\Sigma(w^*x)+b)$, where x is a value of the data received from each node in the previous layer, w is a weight corresponding to each node, b is a bias value, and f( ) is an activation function, and outputs the data of the calculation result to the plurality of nodes in the subsequent layer. The activation function is, for example, an ReLU function or a sigmoid function. The activation function may be other functions generally used in machine learning.

The output layer of the learning model 231 has a single node 43. The plurality of nodes 42n included in an n-th intermediate layer output data to the node 43 included in the output layer. The node 43 in the output layer receives data from the plurality of nodes 42n, performs calculation on the received data by using parameters, and outputs the information indicating the presence or absence of the pulse wave. For example, the activation function at the node 43 is a function that outputs data representing whether or not a calculation result of $(\Sigma(w^*x)+b)$ is a positive value. For example, the node 43 may output a value of 1 as data representing the positive value and output a value of zero as data representing the value of zero or less. For example, the data representing the positive value is the information indicating that there is a pulse wave, and the data representing the value of zero or less is the information indicating that there is no pulse wave. The node 43 may output a probability that the pulse wave is included in the signal. The learning model 231 may be a neural network having a single intermediate layer. In the learning model 231, as the neural network, a convolutional neural network (CNN) may be used, or regions with convolutional neural networks (RCNN) or a segmentation network may be used.

The learning of the learning model 231 is performed by the learning device 5 similarly to the first embodiment. The learning device 5 executes the same processes as those of S11 to S14. In S11, the calculation unit 51 of the learning device 5 generates the plurality of time-series first signal value sequences each constituting the signal including the pulse wave and including the noise. In S11, the calculation unit 51 normalizes the first signal value sequences so that the signal values are included in a predetermined range. Due to performing the normalization, there is no need to handle pulse waves of various sizes. In S12, the calculation unit 51 generates the plurality of time-series second signal value sequences each constituting the signal not including the pulse wave but including the noise. In S13, the calculation unit 51 associates the information indicating that the pulse wave is included in the signal with the first signal value sequence and associates the information indicating that the pulse wave is not included in the signal with the second signal value sequence. In S14, the calculation unit 51 adjusts the parameters of the learning model 231 so that the information indicating that the step wave is included in the signal is substantially output when the first signal value sequence is collectively input and the information indicating that the step wave is not included in the signal is substantially output when the signal values included in the second signal value sequence is collectively input. The calculation unit 51 performs the machine learning of the learning model 231 by repeating the process by using the plurality of first signal value sequences and the plurality of second signal value sequences.

The calculation unit 51 stores the learned data 534 in which the adjusted final parameters are recorded in the storage unit 53. In this manner, the learned learning model 231 is generated. The learning model 231 included in the processing unit 23 is manufactured based on the learned data 534. For example, the learning model 231 is manufactured by writing the parameters recorded in the learned data 534 to the FPGA included in the processing unit 23.

The signal processing device 2 executes the same processes as those of S21 to S28. In S24, the waveform shaping unit 22 inputs the signal value to the processing unit 23 and the wave height measuring unit 24. The processing unit 23 sequentially stores the signal values in the buffer memory 232, and the wave height measuring unit 24 sequentially stores the signal values in the buffer memory 241. The processes of S21 to S24 are individually and repeatedly executed, and the signal values are sequentially stored in the buffer memories 232 and 241.

In S25, the processing unit 23 collectively inputs the signal value sequence made of the plurality of signal values to the learning model 231. At this time, the processing unit 23 normalizes the signal value sequence so that the signal value is included in a predetermined range and, after that, inputs the signal value sequence to the learning model 231. For example, the processing unit 23 performs normalization by dividing each signal value by the maximum value in the signal value sequence. By normalizing the signal value sequence, the magnitude of the pulse wave is allowed to be uniform. By normalization, the pulse wave having any magnitude can be detected by the same process using the learning model 231. Since any pulse wave can be detected by the same process, the detection accuracy of the pulse wave is stabilized. When learning the learning model 231, it is not necessary to perform the learning so that pulse waves of various sizes can be detected. For this reason, the learning model 231 is simplified, and the learning of the learning model 231 is simplified. The processing unit 23 may thin out the signal values included in the signal value sequence and, then, input the signal values to the learning model 231. When the process of S25 is repeated, the processing unit 23 may input all the signal value sequence having different signal values to the learning model 231 each time when the process of S25 is performed or may input the signal value sequence in which some signal values are duplicated.

In S26, as described above, the learning model 231 to which the signal value sequence is input performs the calculation of the neural network and outputs the information indicating whether or not the pulse wave is included in the signal configured with the signal value sequence. By the calculation of the neural network, the learning model 231 can determine whether or not the pulse wave is included in the signal configured with the signal value sequence made of the plurality of signal values input collectively. When the learning model 231 outputs the information indicating that the pulse wave is included in the signal, the processing unit 23 inputs the information indicating that the pulse wave is included in the signal to the wave height measuring unit 24.

In S27, when the information indicating that the pulse wave is included in the signal is input, the wave height measuring unit 24 reads the signal value sequence constituting the signal in which the pulse wave is included from the buffer memory 241. For example, the wave height measuring unit 24 reads the signal value sequence equivalent to the signal value sequence input to the learning model 231 in S25 from the buffer memory 241. For example, the wave height measuring unit 24 reads the signal value sequence input before a predetermined time from the time when the information is input or reads the signal value sequence made of the plurality of signal values including the signal value input before a predetermined number of times from the latest signal value. The predetermined time or the predetermined number of times is defined in advance according to the processing time required by the processing unit 23. In order to accurately measure the wave height of the pulse wave, the wave height measuring unit 24 may read the signal value sequence not exactly matching the signal value sequence input to the learning model 231 in S25. The wave height measuring unit 24 measures the wave height of the pulse wave included in the signal configured with the read signal value sequence.

The signal processing device 2 repeatedly executes the processes of S21 to S28 individually. The signal processing device 2 outputs the data representing the relationship between the wave height of the pulse wave and the number of counts, and the analyzing unit 3 is input with the data output by the signal processing device 2 to generate the spectrum of the radiation detected by the radiation detector 1. The analyzing unit 3 may perform the elemental analysis of the radiation source based on the spectrum of radiation.

It is desirable that the signal value sequence input to the learning model 231 includes a sufficient number of signal values for the signal to represent the pulse wave. For example, the number of signal values included in the signal value sequence is the number such that a total time interval of the signal values exceeds the width of the pulse wave. In order to effectively detect the pulse wave having a small wave height included in the signal including noise, there is a need that the time length of the signal configured with the signal value sequence is sufficiently larger than the width of the pulse wave. For this reason, more specifically, it is desirable that the total time interval of the signal values included in the signal value sequence input to the learning model 231 is several times or more the width of the pulse wave.

Since the length of time of the signal configured with the signal value sequence is sufficiently larger than the width of the pulse wave, there are various positions of the pulse wave in the signal configured with the signal value sequence. For example, there is a case that the pulse wave may be located near the center of the signal, there is a case that the pulse wave may be located immediately after the start of the signal, and there is a case that the pulse wave may be located immediately before the end of the signal. It is desirable that, in S13, when the pulse wave is located in a predetermined range in the signal configured by the first signal value sequence, the learning device 5 associates the information indicating that the pulse wave is included in the signal with the first signal value sequence. It is desirable that, when the pulse wave is located at a position outside a predetermined range in the signal configured with the signal value sequence, the learning device 5 uses the signal value sequence as the second signal value sequence and associates the information indicating that the pulse wave is not included in the signal with the second signal value sequence. For example, when the pulse wave is located near the center of the signal, the signal value sequence is used as the first signal value sequence, and when the pulse wave is located at a position deviated from the center of the signal, the signal value sequence is used as the second signal value sequence.

By learning the learning model 231 in this manner, the pulse wave located in a predetermined range in the signal configured with the signal value sequence input to the learning model 231 is detected. The pulse waves located at a position outside a predetermined range in the signal are not detected. Even if the signal value sequences are input to the learning model 231 multiple times and the same pulse wave is included in the signal configured with the plurality of signal value sequences while the position is changed, the same pulse wave is prevented from being repeatedly detected.

As described above in detail, also in the third embodiment, the signal processing device 2 determines the presence or absence of the pulse wave in the signal from the radiation detector 1 by using the learning model 231. Accordingly, the signal processing device 2 can detect the pulse wave having a small wave height, detect the radiation having low energy, and count the radiation. When the radiation detecting device 10 detects fluorescent X-rays, light elements having low fluorescent X-ray energy can be detected by the elemental analysis.

It is noted that, as illustrated by a broken line in FIG. 11, the processing unit 23 may have a form in which the signal is input from the A/D converting unit 21 and the presence or absence of the step wave in the signal is determined by using the learning model 231. In this embodiment, the learning model 231 is collectively input with the signal value sequence constituting the signal from the A/D converting unit 21 and outputs the information indicating whether or not the step wave is included in the signal configured with the input signal value sequence. The wave height measuring unit 24 measures the wave height of the step wave or the pulse wave when the information indicating that the step wave is included in the signal is input from the processing unit 23.

Alternatively, the processing unit 23 may have a form in which the signals are input from the A/D converting unit 21 and the waveform shaping unit 22 and the presence or absence of the pulse wave is determined by using the learning model 231. In this embodiment, the learning model 231 is learned so as to collectively input with the signal value sequence constituting the signal from the A/D converting unit 21 and the signal value sequence constituting the signal from the waveform shaping unit 22 and to output the information indicating the presence or absence of the pulse wave in the signal from the waveform shaping unit 22. The wave height measuring unit 24 measures the wave height of the pulse wave when the information indicating that the pulse wave is included in the signal is input from the processing unit 23.

Fourth Embodiment

Figure 13:
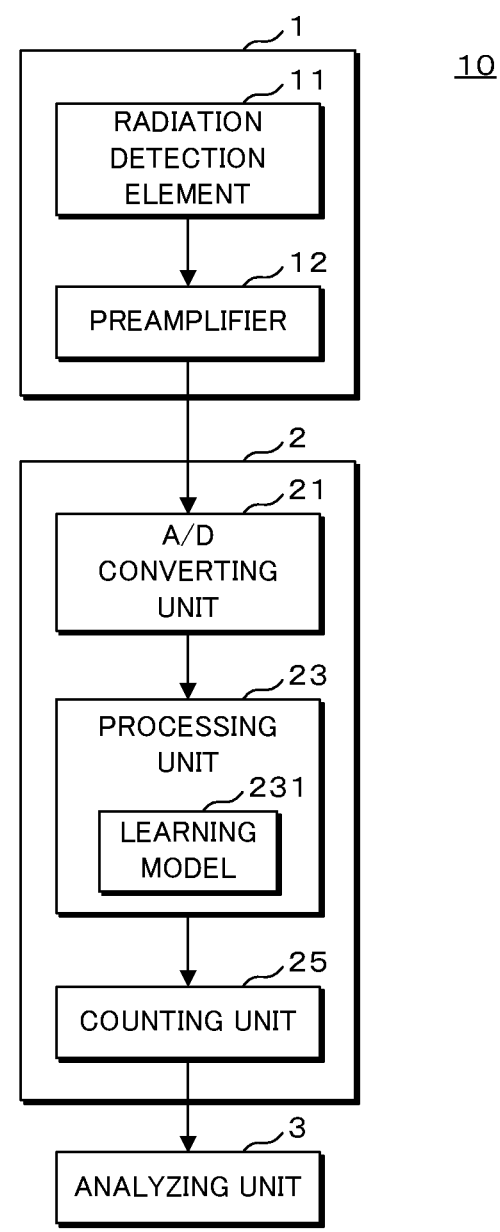
FIG. 13 is a block diagram illustrating a functional configuration of a radiation detecting device according to a fourth embodiment.

In a fourth embodiment, a form in which a learning model 231 determines a wave height of a step wave is illustrated. FIG. 13 is a block diagram illustrating a functional configuration of a radiation detecting device 10 according to the fourth embodiment. Configurations and functions of a radiation detector 1 and an analyzing unit 3 are the same as those in the first embodiment. A signal processing device 2 includes an A/D converting unit 21, a processing unit 23, and a counting unit 25. The A/D converting unit 21 inputs the signal including the step wave to the processing unit 23. The processing unit 23 determines the wave height of the step wave included in the signal input from the A/D converting unit 21 and inputs the wave height to the counting unit 25.

Figure 14:
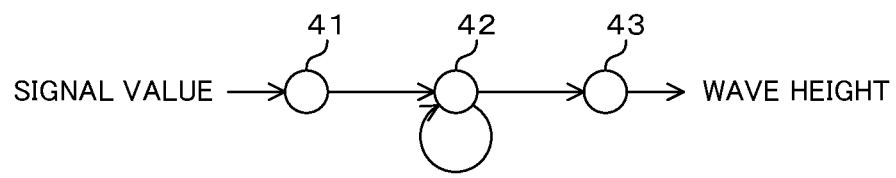
FIG. 14 is a conceptual diagram illustrating a first example of a functional configuration of a learning model according to the fourth embodiment.

FIG. 14 is a conceptual diagram illustrating a first example of a functional configuration of the learning model 231 according to the fourth embodiment. Similarly to the first or second embodiment, the learning model 231 uses the RNN. The signal values are sequentially input to a node 41 in an input layer. A node 42 in an intermediate layer receives data from the node 41 in the input layer and further feeds back the previous output. A node 43 in an output layer receives data from the node 42 in the intermediate layer, performs calculation on the received data by using parameters, and outputs the wave height of the step wave. For example, the node 43 outputs the value of zero as the wave height when the step wave is not included in the signal, and the node 43 outputs the value of the wave height when the step wave is included in the signal.

Similarly to the first or second embodiment, a learning model 231 executes sequential processes and outputs the wave height of the step wave each time when the signal value is input. All the signal values included in the signal value sequence constituting the signal may be sequentially input to the learning model 231, or for each of the plurality of signal values, one signal value may be sequentially input. The learning model 231 is learned in advance so as to output the wave height of the step wave included in the signal configured with the signal value sequence made of the plurality of signal values including the input signal value. The learning model 231 may use an LSTM.

The learning of the learning model 231 is performed by a learning device 5 similarly to the first or second embodiment. The learning device 5 executes the same processes as those of S11 to S14. In S11, a calculation unit 51 of the learning device 5 generates the plurality of time-series first signal value sequences each constituting the signal including the step wave and the noise. In S12, the calculation unit 51 generates the plurality of time-series second signal value sequences each constituting the signal including the noise but not including the step wave. In S13, the calculation unit 51 associates the wave height of the step wave with the first signal value sequence and associates zero as the wave height with the second signal value sequences. In S14, the calculation unit 51 adjusts the parameters of the learning model 231 so that the wave height of the step wave is substantially output when the signal values included in the first signal value sequence are sequentially input and the value of zero as the wave height is substantially output when the signal values included in the second signal value sequence are sequentially input. The calculation unit 51 performs the machine learning of the learning model 231 by repeating the process by using the plurality of first signal value sequences and the plurality of second signal value sequences.

Figure 15:
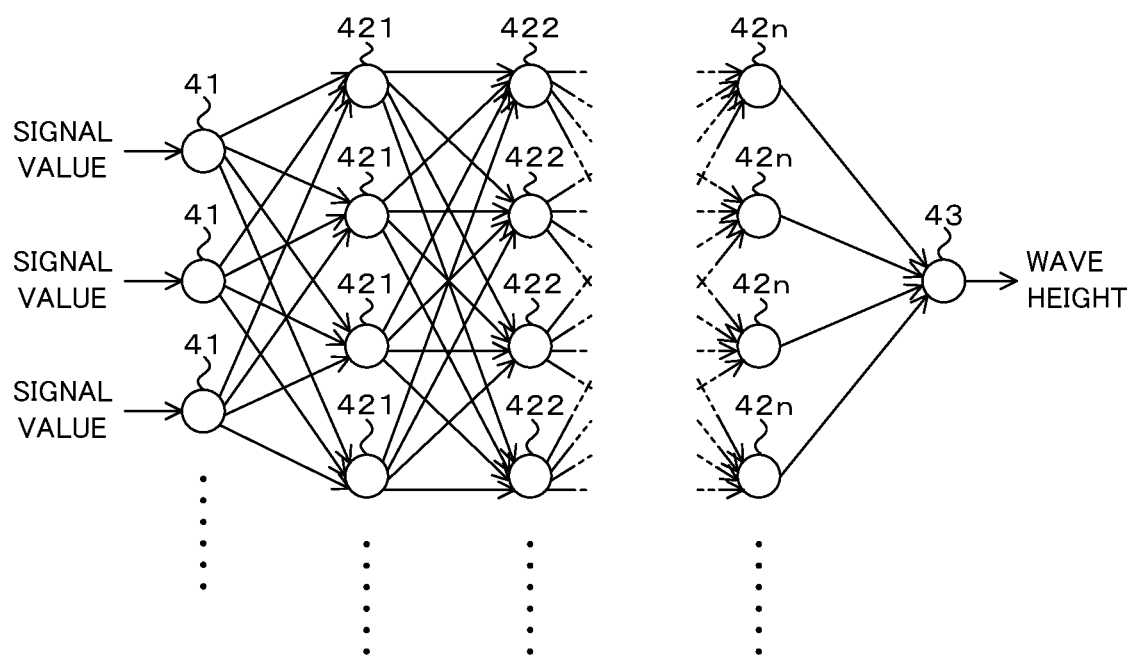
FIG. 15 is a conceptual diagram illustrating a second example of the functional configuration of the learning model according to the fourth embodiment.

The learning model 231 may have a form in which the signal value sequence made of the plurality of signal values is collectively input. FIG. 15 is a conceptual diagram illustrating a second example of the functional configuration of the learning model 231 according to the fourth embodiment. The learning model 231 uses the fully connected neural network similarly to the third embodiment. The input layer has the plurality of nodes 41 to which the plurality of signal values included in the signal value sequence are input. The learning model 231 has n intermediate layers. A plurality of nodes 421 included in a first intermediate layer receive data from the node 41 in the input layer, perform calculation by using parameters, and outputs data of a calculation result to a plurality of nodes 422 included in a second intermediate layer. The node included in each intermediate layer receives data from the plurality of nodes in the previous intermediate layer, performs calculation on the received data by using parameters, and outputs the data to the nodes in the subsequent intermediate layer. The output layer of the learning model 231 has a single node 43. The node 43 in the output layer receives data from the plurality of nodes 42n, performs calculation on the received data by using parameters, and outputs the wave height. The learning model 231 is learned in advance so as to output the wave height of the step wave included in the signal configured with the signal value sequence when the signal value sequence made of the plurality of signal values is collectively input. The learning model 231 may be a neural network having a single intermediate layer. In the learning model 231, as the neural network, a CNN may be used, or an RCNN or a segmentation network may be used.

The learning of the learning model 231 is performed by the learning device 5 similarly to the third embodiment. The learning device 5 executes the same processes as those of S11 to S14. In S11, the calculation unit 51 of the learning device 5 generates the first signal value sequence that constitutes the signal including the step waves and the noise. In S12, the calculation unit 51 generates the second signal value sequence that constitutes the signal not including the step waves but including the noise. In S13, the calculation unit 51 associates the wave height of the step wave with the first signal value sequence and associates zero as the wave height with the second signal value sequences. In S14, the calculation unit 51 adjusts the parameters of the learning model 231 so that the wave height of the step wave is substantially output when the first signal value sequence is input and so that the value of zero as the wave height is substantially output when the second signal value sequence is input. The calculation unit 51 performs the machine learning of the learning model 231 by repeating the process by using the plurality of first signal value sequences and the plurality of second signal value sequences.

Figure 16:
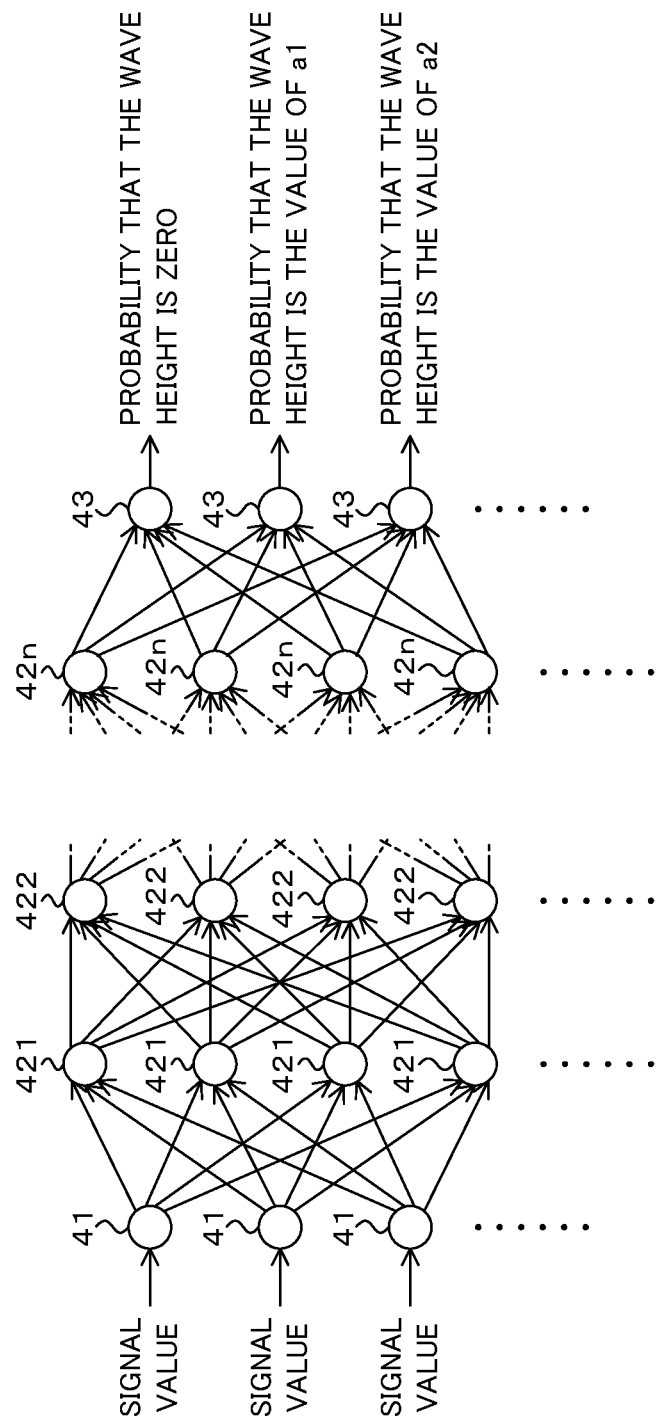
FIG. 16 is a conceptual diagram illustrating a third example of the functional configuration of the learning model according to the fourth embodiment.

The learning model 231 may have a form of outputting a probability that the wave height is each value. FIG. 16 is a conceptual diagram illustrating a third example of the functional configuration of the learning model 231 according to the fourth embodiment. The input layer has the plurality of nodes 41 to which the plurality of signal values included in the signal value sequence are input. The learning model 231 has n intermediate layers. The output layer of the learning model 231 has the plurality of nodes 43. Each of the nodes 43 receives data from the plurality of nodes 42n and performs calculation on the received data by using parameters. One node 43 outputs a probability that the wave height of the step wave is zero. Each of the other nodes 43 outputs a probability that the wave height is the value of a1, a2, . . . . The node 43 may output a probability as a real number from 0 to 1 or may output as a binary value of 0 or 1. The learning model 231 is learned in advance so that the probability of being output for the same value as the wave height of the step wave is maximized when the signal value sequence made of the plurality of signal values is collectively input. The learning model 231 may be the neural network having the single intermediate layer. In the learning model 231, as a neural network, a CNN may be used, or an RCNN or a segmentation network may be used.

The learning of the learning model 231 is performed by the learning device 5 similarly to the third embodiment. The learning device 5 executes the same processes as those of S11 to S14. In S11, the calculation unit 51 of the learning device 5 generates the first signal value sequences constituting the signal configured with the step wave and the noise. In S12, the calculation unit 51 generates the second signal value sequences constituting the signal not including the step waves but including the noise. In S13, the calculation unit 51 associates the information indicating that the probability corresponding to the wave height of the step wave is maximized with the first signal value sequence and associate the information indicating that the probability that the wave height is zero is maximized with the second signal value sequence. In S14, the calculation unit 51 adjusts the parameters of the learning model 231 so that a probability with respect to the same value as the wave height of the step wave included in the signal configured by the first signal value sequence is maximized when the first signal value sequence is input and so that a probability that the wave height is zero is maximized when the second signal value sequence is input. The calculation unit 51 performs the machine learning of the learning model 231 by repeating the process by using the plurality of first signal value sequences and the plurality of second signal value sequences.

FIG. 17 is a flowchart illustrating a procedure of processes executed by the signal processing device 2 according to the fourth embodiment. The signal processing device 2 is input with the signal from the radiation detector 1 (S31), and the A/D converting unit 21 converts the signal into A/D (S32). The A/D converting unit 21 inputs the A/D-converted signal to the processing unit 23.

The processing unit 23 inputs the signal values constituting the input signal to the learning model 231 (S33). In S33, the processing unit 23 sequentially inputs the signal values to the learning model 231 or collectively inputs the signal value sequence made of the plurality of signal values to the learning model 231. As described above, the learning model 231 performs the calculation of the neural network and outputs the wave height of the step wave included in the signal or outputs a probability that the wave height is each value. The processing unit 23 inputs the value of the wave height output by the learning model 231 to the counting unit 25 or inputs the value of the wave height having the maximum probability output by the learning model 231 to the counting unit 25. When the wave height is zero, the processing unit 23 needs not to input the wave height to the counting unit 25.

The counting unit 25 specifies the wave height based on the input information (S34). When the wave height is zero (YES in S34), the counting unit 25 does not count, and the signal processing device 2 ends the process. When the wave height is not zero (NO in S34), the counting unit 25 counts the step waves by wave height (S35) and ends the process. The signal processing device 2 repeatedly executes the processes of S31 to S35 individually. The signal processing device 2 outputs data representing a relationship between the wave height of the step wave and the number of counts, the analyzing unit 3 is input with data output by the signal processing device 2 to generate a spectrum of the radiation detected by the radiation detector 1. The analyzing unit 3 may perform the elemental analysis of the radiation source based on the spectrum of the radiation.

As described above in detail, in the fourth embodiment, the signal processing device 2 measures the wave height of the step wave in the signal from the radiation detector 1 by using the learning model 231. Accordingly, the signal processing device 2 can detect the step wave having a small wave height, detect the radiation having low energy, and count the radiation. When the radiation detecting device 10 detects fluorescent X-rays, light elements having low fluorescent X-ray energy can be detected by the elemental analysis. When the recurrent neural network is used as the learning model 231, the processing unit 23 can be configured to output the information on the wave height of one step wave for one step wave included in the signal. For this reason, the configuration of the signal processing device 2 can be simplified.

Fifth Embodiment

Figure 18:
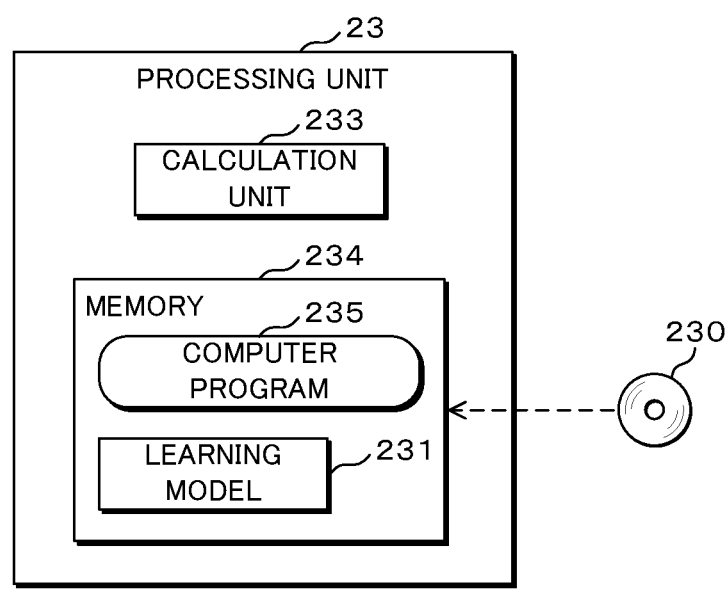
FIG. 18 is a block diagram illustrating a functional configuration of a processing unit according to a fifth embodiment.

FIG. 18 is a block diagram illustrating a functional configuration of a processing unit 23 according to a fifth embodiment. The processing unit 23 has a calculation unit 233 and a memory 234. The calculation unit 233 is configured by using, for example, a CPU, a GPU, or a multi-core CPU. The calculation unit 233 may be configured by using a quantum computer. The memory 234 is a non-volatile memory. The memory 234 stores a computer program 235. A computer program 235 is read from the recording medium 230 such as an optical disk for storing the computer program 235 by a recording device (not illustrated) and is stored in the memory 234 by writing in the memory 234. The calculation unit 233 executes the processing required for the processing unit 23 according to the computer program 235. The learning model 231 is realized by the calculation unit 233 executing information processing according to the computer program 235.

The calculation unit 233 executes the processes required for the processing unit 23 in the first to fourth embodiments by executing the information processing according to the computer program 235. In this manner, the processing unit 23 in the first to fourth embodiments is realized. Configurations and functions of a radiation detector 1 and an analyzing unit 3 are the same as those of the first to fourth embodiments. Configurations and functions of components other than the processing unit 23 of a signal processing device 2 are the same as those of the first to fourth embodiments. The signal processing device 2 and the radiation detecting device 10 perform the same processes as those in the first to fourth embodiments.

Also in the fifth embodiment, the signal processing device 2 measures the wave height of the step wave or the pulse wave in the signal from the radiation detector 1 by using the learning model 231. Accordingly, the signal processing device 2 can detect the pulse wave having a small wave height, detect the radiation having low energy, and count the radiation. When the radiation detecting device 10 detects fluorescent X-rays, light elements having low fluorescent X-ray energy can be detected by the elemental analysis. A portion or all of the components other than the processing unit 23 of the signal processing device 2 may also be realized by using the computer program.

It is noted that, in the first to fifth embodiments, a form is illustrated in which all the processes of acquiring the wave height of the step wave or the pulse wave is performed inside the signal processing device 2, but the signal processing device 2 may have a form of allowing a cloud outside the signal processing device 2 to execute a portion of the processes. For example, the signal processing device 2 may have a form of executing the process by using the learning model 231 in a cloud. Alternatively, the signal processing device 2 may have a form of using both a method of the related art and a method using the learning model 231. For example, the signal processing device 2 may have a form in which the wave height of the step wave or the pulse wave having a large wave height is acquired by a method of the related art and the wave height of the step wave or the pulse wave having a small wave height is acquired by the method using the learning model 231.

Sixth Embodiment

Figure 19:
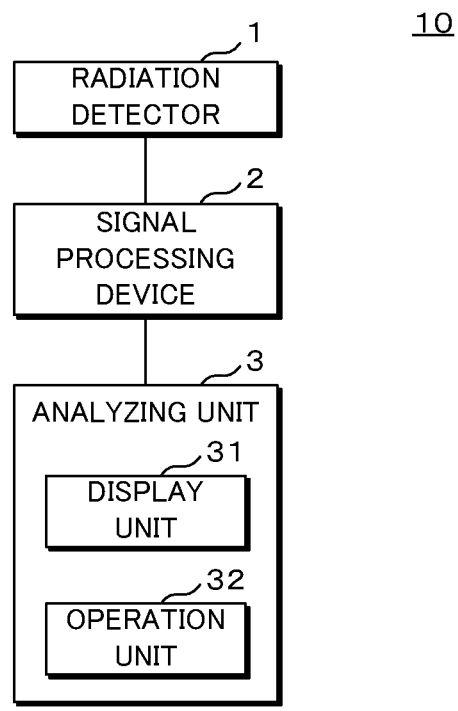
FIG. 19 is a block diagram illustrating a functional configuration of a radiation detecting device according to a sixth embodiment.

FIG. 19 is a block diagram illustrating a functional configuration of a radiation detecting device 10 according to a sixth embodiment. Configuration and function of a radiation detector 1 and a signal processing device 2 are the same as those of any one of the first to fifth embodiments. An analyzing unit 3 includes a display unit 31 and an operation unit 32. The display unit 31 is, for example, a liquid crystal display or an electroluminescent (EL) display. The operation unit 32 receives operation from the user. The analyzing unit 3 displays a spectrum of radiation detected by the radiation detector 1 on the display unit 31.

Figure 20:
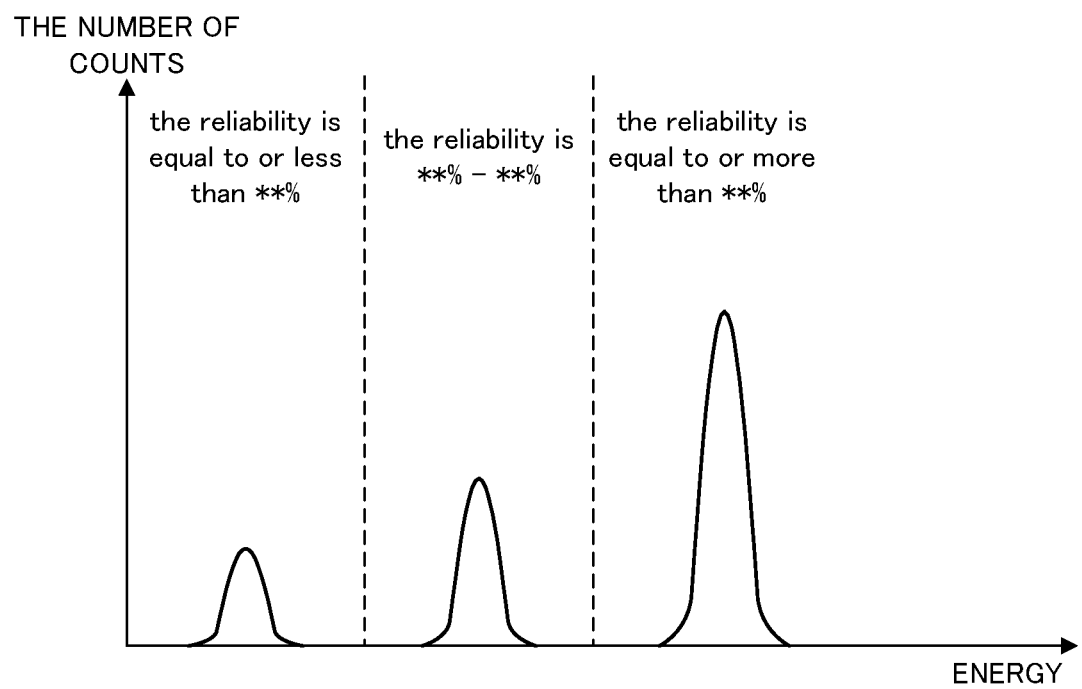
FIG. 20 is a schematic diagram illustrating a first example of a spectrum displayed by a display unit.

FIG. 20 is a schematic diagram illustrating a first example of the spectrum displayed by the display unit 31. The horizontal axis represents the energy of radiation, and the vertical axis represents the number of counts of radiation for each energy. The energy of radiation corresponds to the wave height of the step wave or the pulse wave. As illustrated in FIG. 20, the analyzing unit 3 displays, on the display unit 31, the reliability of determining the presence or absence of the step wave or the pulse wave or the wave height by using the learning model 231 for the plurality of energy ranges included in the spectrum. The analyzing unit 3 acquires the output of the learning model 231 and specifies the reliability according to the output of the learning model 231. For example, the analyzing unit 3 may calculate the average of the reliability obtained from the learning model 231 for the step wave or the pulse wave with the wave height corresponding to each range and display the calculated average of the reliability.

In general, it becomes difficult to detect the step wave or the pulse wave as the wave height becomes smaller, so that there is a tendency that the reliability is reduced as the energy of the radiation becomes lower. Due to displaying of the reliability, the user can know the reliability for each peak included in the spectrum and the presence of the element for each peak. For the radiation of energy with low reliability, more reliable the elemental analysis can be performed by repeating the measurement as necessary.

Figure 21A:
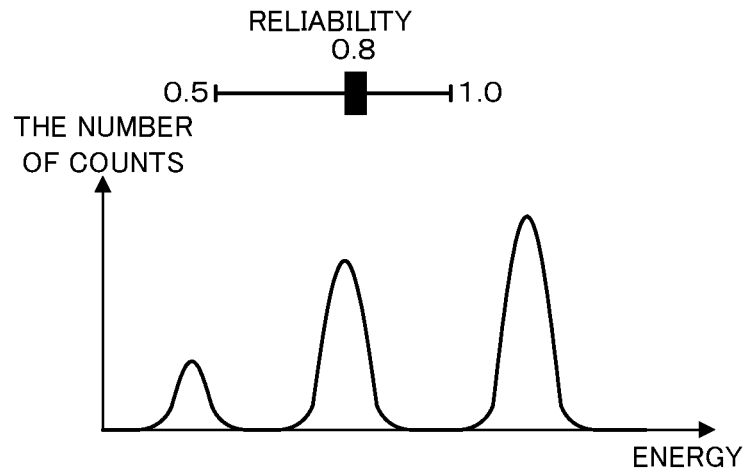
FIG. 21A is a schematic diagram illustrating a second example of the spectrum displayed by the display unit.
Figure 21B:
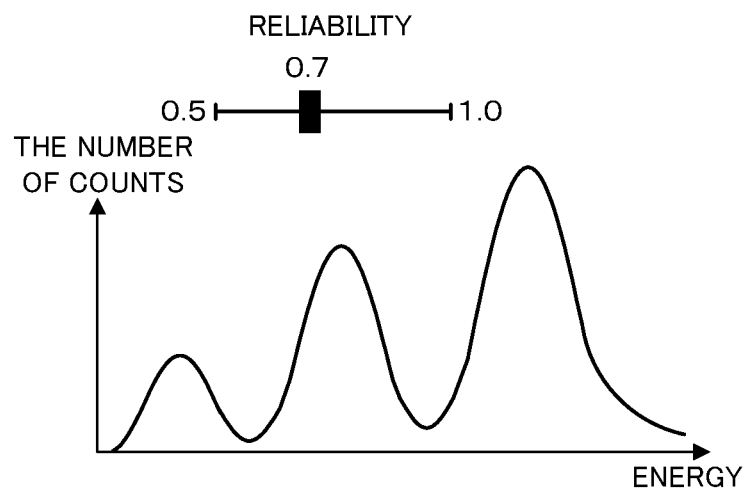
FIG. 21B is a schematic diagram illustrating the second example of the spectrum displayed by the display unit.
Figure 21C:
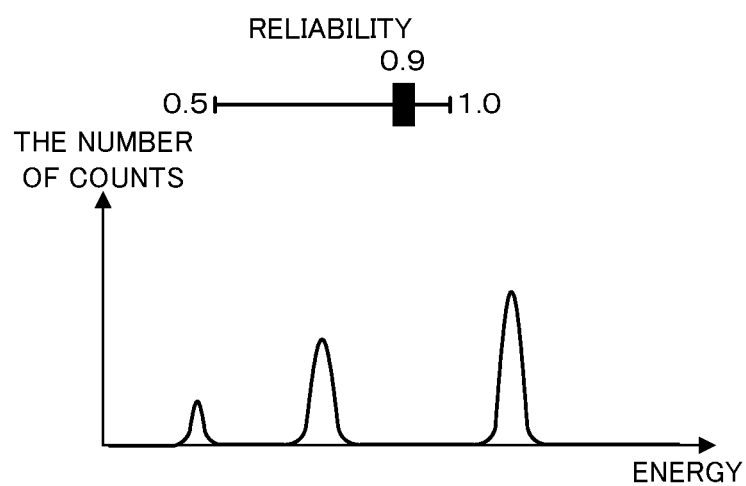
FIG. 21C is a schematic diagram illustrating the second example of the spectrum displayed by the display unit.

FIGS. 21A, 21B, and 21C are schematic diagrams illustrating a second example of the spectrum displayed by the display unit 31. The horizontal axis represents the energy of radiation, and the vertical axis represents the number of counts of radiation for each energy. The analyzing unit 3 displays a slide bar for designating the reliability in addition to the spectrum. The user can designate the reliability by using the slide bar by operating the operation unit 32. The analyzing unit 3 displays the spectrum generated from the step wave or the pulse wave having a reliability equal to or higher than the designated reliability on the display unit 31. FIG. 21A illustrates an example of the spectrum generated from the step wave or the pulse wave having a reliability of 0.8 or higher. FIG. 21B illustrates an example of the spectrum generated from the step wave or the pulse wave having a reliability of 0.7 or higher. FIG. 21C illustrates an example of the spectrum generated from the step wave or the pulse wave having a reliability of 0.9 or higher.

As the reliability is lowered, the intensity of the peak in the spectrum is increased, and the width of the peak is also increased. As the reliability is heightened, the intensity of the peak is decreased, the width of the peak is decreased, and the peak becomes sharpened. By increasing the reliability, the accuracy of the elemental analysis can be improved based on the spectrum having a highly reliability. By reducing the reliability, the intensity of the peak is increased, so that a count rate of the radiation is improved. The user can check the spectrum while changing the reliability and adjust the reliability according to the application. For example, when performing the elemental analysis of the substance in which the distance between peaks in the fluorescent X-ray spectrum is long, the reliability may be reduced. When inspecting the presence or absence of foreign matter in the substance, the reliability may be reduced in order to improve the counting rate and shorten the inspection time, even at the expense of quantitativity. When performing the elemental analysis of the substance with a short distance between peaks in the fluorescent X-ray spectrum, there is a need to increase the reliability so that the peaks can be separated.

Figure 22:
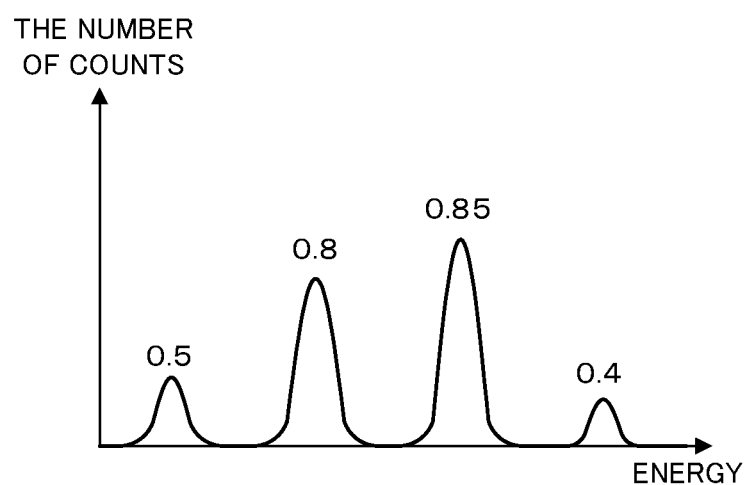
FIG. 22 is a schematic diagram illustrating a third example of the spectrum displayed by the display unit.
Figure 23:
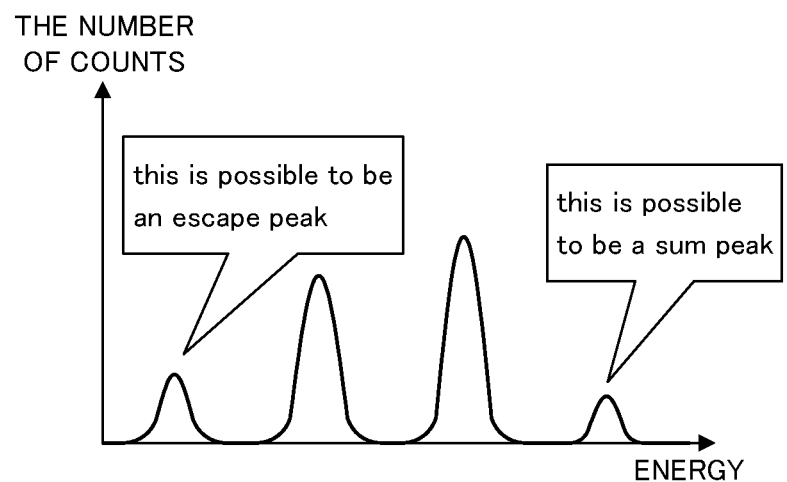
FIG. 23 is a schematic diagram illustrating a fourth example of the spectrum displayed by the display unit.

FIG. 22 is a schematic diagram illustrating a third example of the spectrum displayed by the display unit 31. The horizontal axis represents the energy of radiation, and the vertical axis represents the number of counts of the radiation for each energy. The analyzing unit 3 numerically displays the reliability for each peak. FIG. 23 is a schematic diagram illustrating a fourth example of the spectrum displayed by the display unit 31. The horizontal axis represents the energy of radiation, and the vertical axis represents the number of counts of the radiation for each energy. The analyzing unit 3 displays warning for a peak with low reliability. In the example illustrated in FIG. 23, the analyzing unit 3 displays warning indicating that there is a possibility of the escape peak or the sum peak for the peak that is likely to be an escape peak or a sum peak with a low reliability.

The reliability is determined according to the state of the detected step wave or pulse wave. For example, the analyzing unit 3 performs a process of reducing the reliability when the detected width of the step wave or pulse wave is longer than the width of the step wave or pulse wave in the past. For example, the analyzing unit 3 performs the process of reducing the reliability when the wave height of the step wave or the pulse wave is equal to the wave height of the step wave or the pulse wave detected frequently in the past. In this case, there is a possibility that the step wave or the pulse wave may correspond to the sum peak. For example, the analyzing unit 3 performs the process of reducing the reliability when the wave height of the step wave or the pulse wave is a value obtained by subtracting a predetermined value from the wave height of the step wave or the pulse wave detected frequently in the past. In this case, there is a possibility that the step wave or the pulse wave may correspond to the escape peak. For example, the learning model 231 may output a probability that the step wave or the pulse wave is included in the signal or a probability that the wave height is each value, and the analyzing unit 3 may use the probability output by the learning model 231 as the reliability.

Reliability displaying methods illustrated in FIGS. 20 to 23 are examples, and the displaying methods are not limited to these. For example, the analyzing unit 3 may change a color of the energy range or the peak by reliability. For example, the analyzing unit 3 may display only the energy range or the peak having a certain range of reliability, or may display a plurality of spectra having different reliability side by side.

It is noted that, in the first to sixth embodiments, a form is illustrated in which the first signal value sequence and the second signal value sequence constituting the signal including the noise are used, but the first signal value sequence and the second signal value sequence may be the signal value sequence constituting the signal not including the noise. In S11, the learning device 5 generates the first signal value sequence including the step wave or the pulse wave and not including the noise, and in S12, the learning device 5 generates the second signal value sequence constituting the signal not including any one of the step wave and the pulse wave and not including the noise. The learning device 5 may use both the first signal value sequence and the second signal value sequence constituting the signal including the noise and the first signal value sequence and the second signal value sequence constituting the signal not including the noise as training data. Alternatively, the learning device 5 may use the first signal value sequences constituting the signal including the noise and the second signal value sequences constituting the signal not including the noise, or may use the first signal value sequences constituting the signal not including the noise and the second signal value sequences constituting the signal including the noise.

In the first to sixth embodiments, a form is illustrated in which the step wave or the pulse wave is detected only by the process using the learning model 231, but the signal processing device 2 may have a form of using the process using the learning model 231 and the process using the threshold value in combination. For example, the signal processing device 2 may have a form of detecting the step wave or the pulse wave having a high wave height by a process using a threshold and detecting the step wave or the pulse wave having a low wave height by a process using the learning model 231.

The present invention is not limited to contents of the embodiments described above, and various modifications can be made within the scope of the claims. That is, embodiments obtained by combining technical means appropriately modified within the scope of the claims are also included in the technical scope of the present invention.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A signal processing method counting step waves in response to detection of radiation or pulse waves converted from the step waves by wave height, comprising:
   inputting signal value sequence in response to the detection of the radiation to a learning model outputting, when time-series signal value sequence is input, information related to presence or absence of the step wave or the pulse wave in a signal configured with the signal value sequence or information related to a wave height of the step wave or the pulse wave in the signal; and
   counting the step wave or the pulse wave by wave height according to the information output by the learning model.

2. The signal processing method according to claim 1, wherein the learning model uses a recurrent neural network and is input with the signal values included in the signal value sequence sequentially, and when one signal value is input, the learning model outputs the information related to the presence or absence of the step wave or the pulse wave in the signal configured with the signal value sequence or the information related to the wave height of the step wave or the pulse wave in the signal.

3. The signal processing method according to claim 1, wherein, when the signal value sequence made of the plurality of signal values is collectively input, the learning model outputs the information related to the presence or absence of the step wave or the pulse wave in the signal configured with the signal value sequence or the information related to the wave height of the step wave or the pulse wave in the signal.

4. The signal processing method according to claim 3, wherein the signal value sequence is normalized and, after that, collectively input into the learning model.

5. The signal processing method according to claim 1, wherein the learning model outputs information indicating whether or not the step wave or the pulse wave is included in the signal, and
   wherein measuring the wave height of the step wave or the pulse wave when information indicating that the step wave or the pulse wave is included in the signal is output from the learning model.

6. A learning model generating method, comprising:
   acquiring a plurality of time-series first signal value sequences each constituting a signal including a step wave in response to detection of radiation or a pulse wave obtained by converting the step wave and a plurality of time-series second signal value sequences each constituting a signal that not including any one of the step wave and the pulse wave; and
   generating a learning model by using the first signal value sequences, information indicating that there is the step wave or the pulse wave or information indicating a wave height of the step wave or the pulse wave in association with the first signal value sequences, the second signal value sequences, and information indicating that there is no step wave or no pulse wave or information indicating that the wave height of the step wave or the pulse wave is zero in association with the second signal value sequences as training data, the learning model outputting information related to presence or absence of the step wave or the pulse wave in a signal configured with arbitrary signal value sequence or information related to the wave height of the step wave or the pulse in the signal when being input with the arbitrary time-series signal value sequence.

7. The learning model generating method according to claim 6,
wherein, when arbitrary signal value sequence made of a plurality of signal values is collectively input, the learning model outputs information indicating whether or not the step wave or the pulse wave is included in the signal configured with the arbitrary signal value sequence, and
the first signal value sequences are normalized.

8. A signal processing device counting step waves in response to detection of radiation or pulse waves converted from the step waves by wave height, comprising:
a learning model outputting information related to presence or absence of the step wave or the pulse wave in a signal configured with time-series signal value sequence or information related to a wave height of the step wave or the pulse wave in the signal when the signal value sequence is input; and
a counting unit counting the step wave or the pulse wave by wave height according to the information output by the learning model when the signal value sequences in response to the detection of the radiation is input to the learning model.

9. A radiation detecting device, comprising:
a radiation detector outputting a step wave according to energy of radiation when detecting the radiation;
a converting unit converting the step wave into a pulse wave;
a learning model outputting, when time-series signal value sequence constituting a signal before the conversion by the converting unit or after the conversion by the converting unit is input, information indicating whether or not the step wave or the pulse wave is included in the signal;
a wave height measuring unit measuring a wave height of the pulse wave when information indicating that the step wave or the pulse wave is included in the signal is output from the learning model;
a counting unit counting the pulse waves by wave height; and
a spectrum generating unit generating a spectrum of the radiation according to the wave height and the number of counts of the pulse waves.

10. A radiation detecting device, comprising:
a radiation detector outputting step waves according to energy of radiation when detecting the radiation;
a learning model outputting, when time-series signal value sequence constituting a signal output from the radiation detector is input, the information indicating the wave height of the step wave in the signal;
a counting unit counting the step waves by wave height according to the information output by the learning model; and
a spectrum generating unit generating a spectrum of the radiation according to the wave height and the number of counts of the step waves.

11. A non-transitory recording medium recording a computer program causing a computer to execute processing of:
inputting signal value sequence in response to the detection of the radiation to a learning model which outputting, when time-series signal value sequence is input, information related to presence or absence of the step wave or the pulse wave in a signal configured with the signal value sequence or information related to a wave height of the step wave or the pulse wave in the signal; and
outputting the information related to the presence or absence of the step wave or the pulse wave or the information related to the wave height.

* * * * *